Sept. 10, 1968  J. W. LARSON  3,401,277
TWO-PHASE FLUID POWER GENERATOR WITH NO MOVING PARTS
Filed Dec. 31, 1962  16 Sheets-Sheet 1
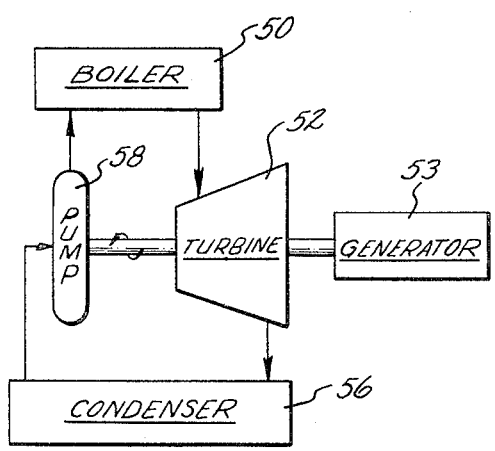
FIG_1
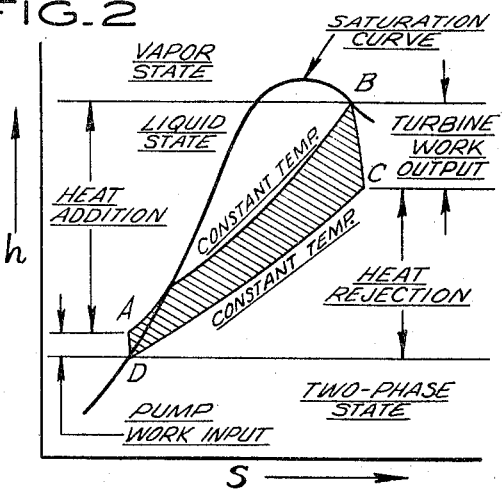
FIG_2
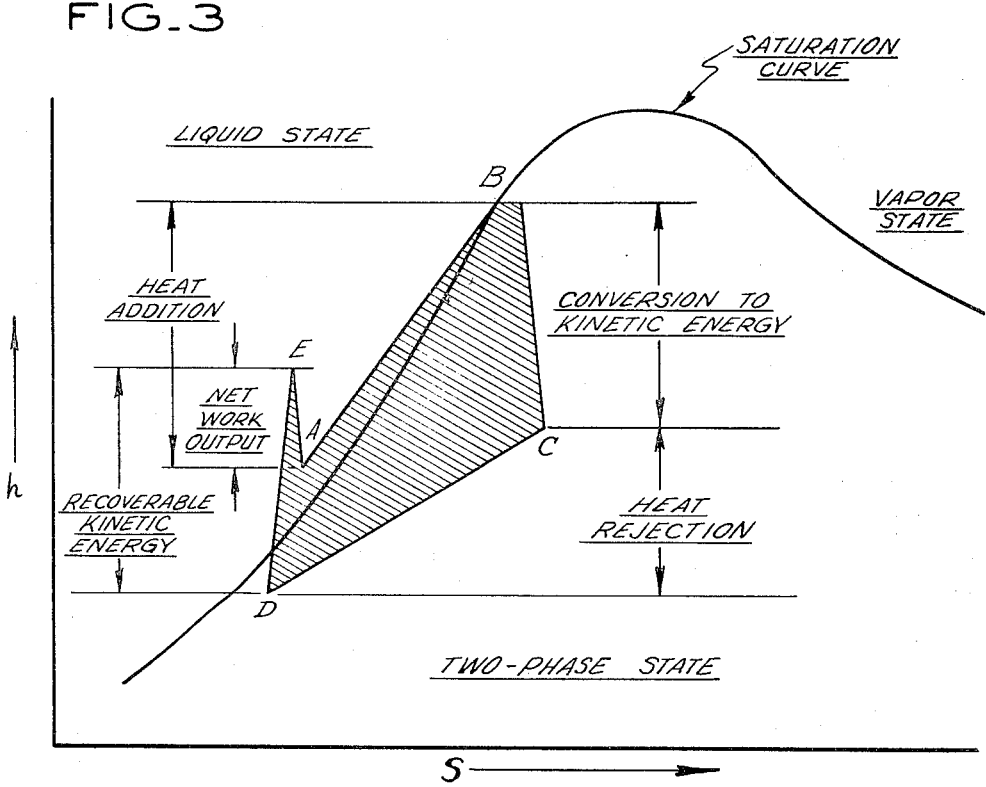
FIG_3
INVENTOR
JOHN W. LARSON
BY Vernon F. Hauschild
ATTORNEY FIG_4
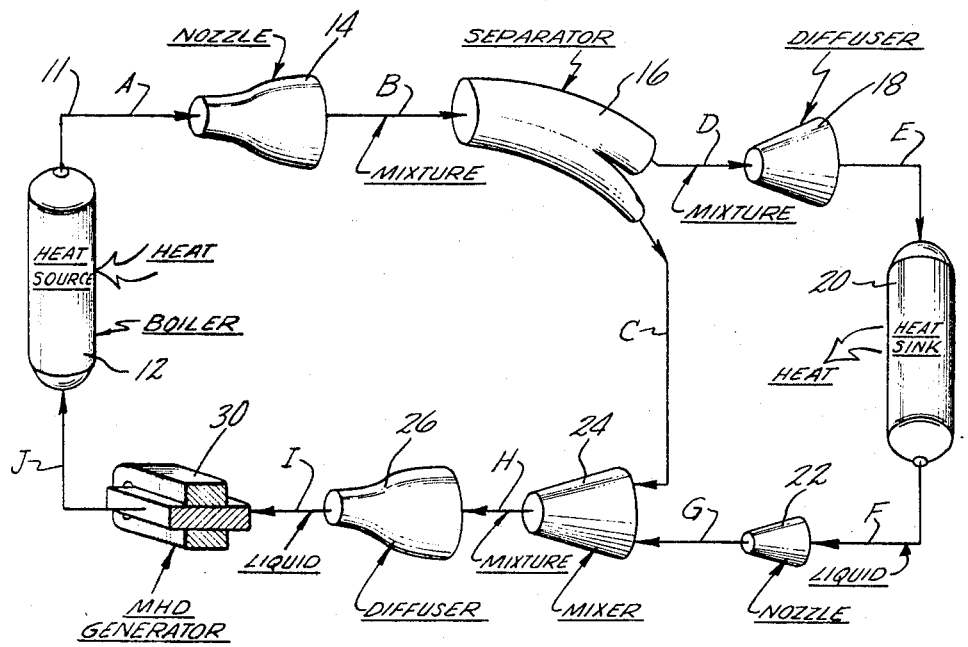
FIG_5
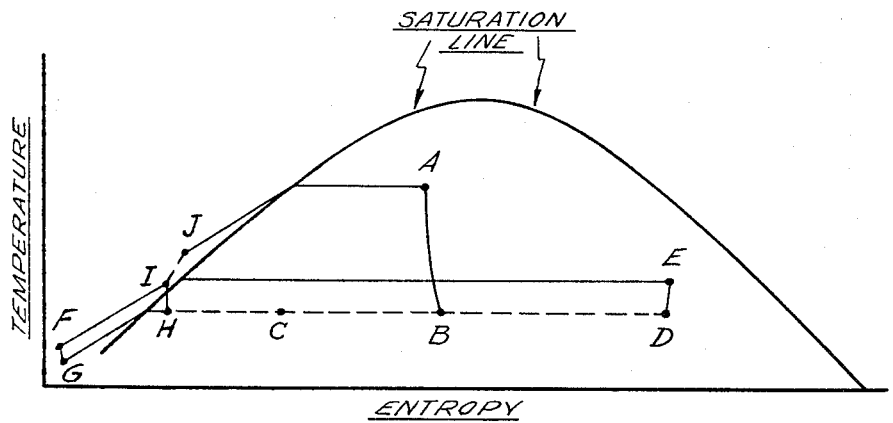

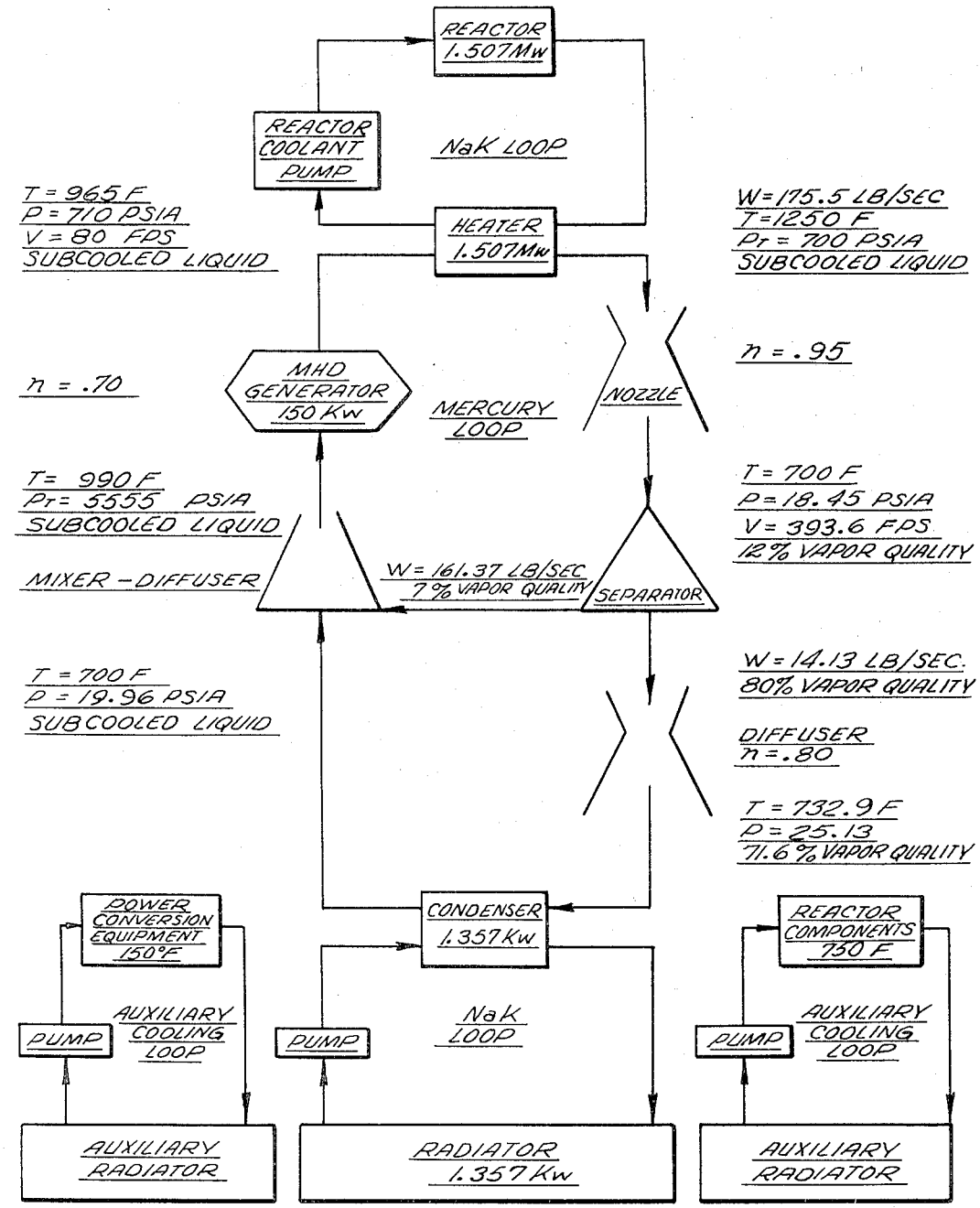
FIG. 7  TWO PHASE MHD MERCURY CYCLE HEAT BALANCE
10% SYSTEM EFFICIENCY

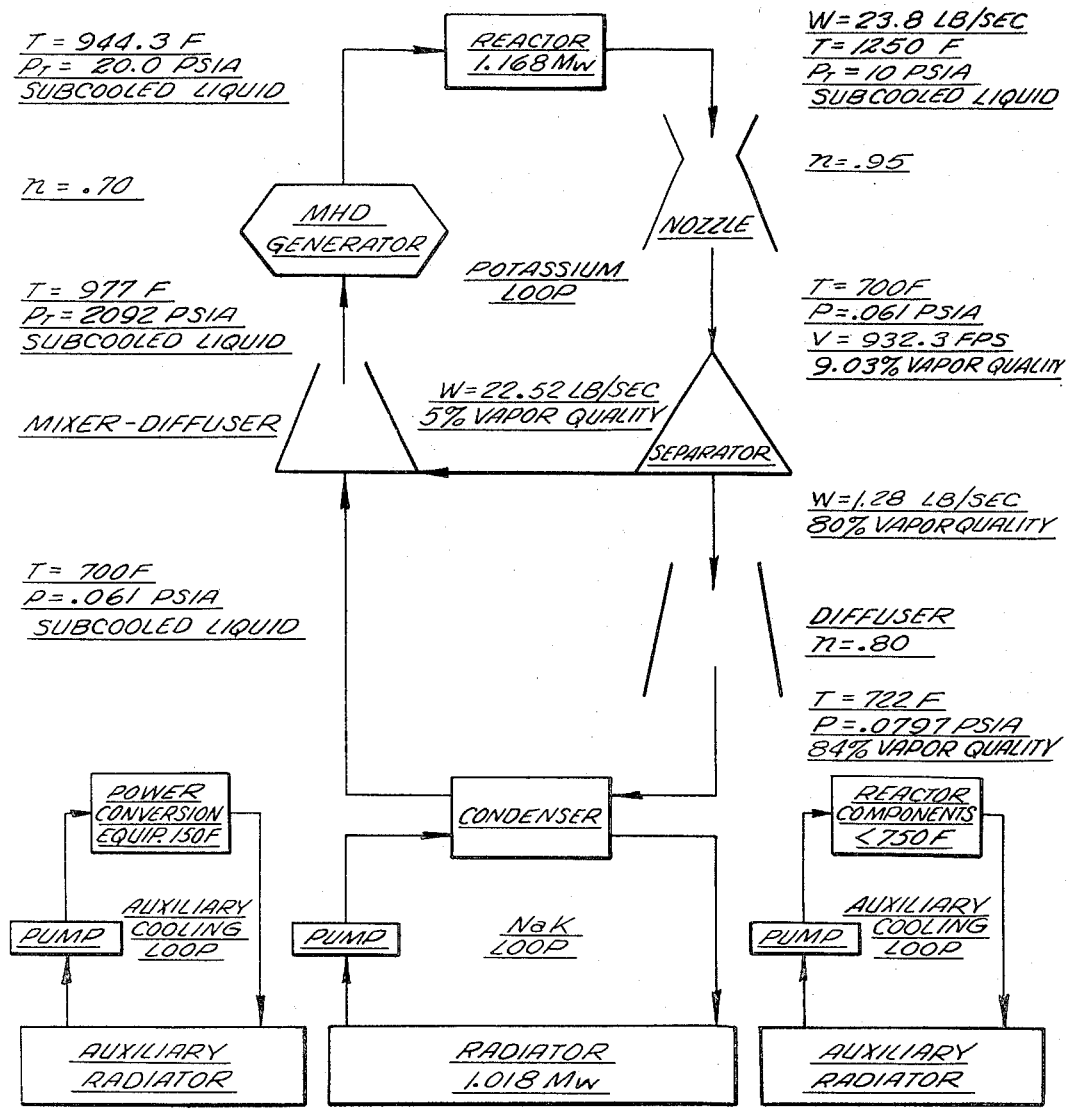

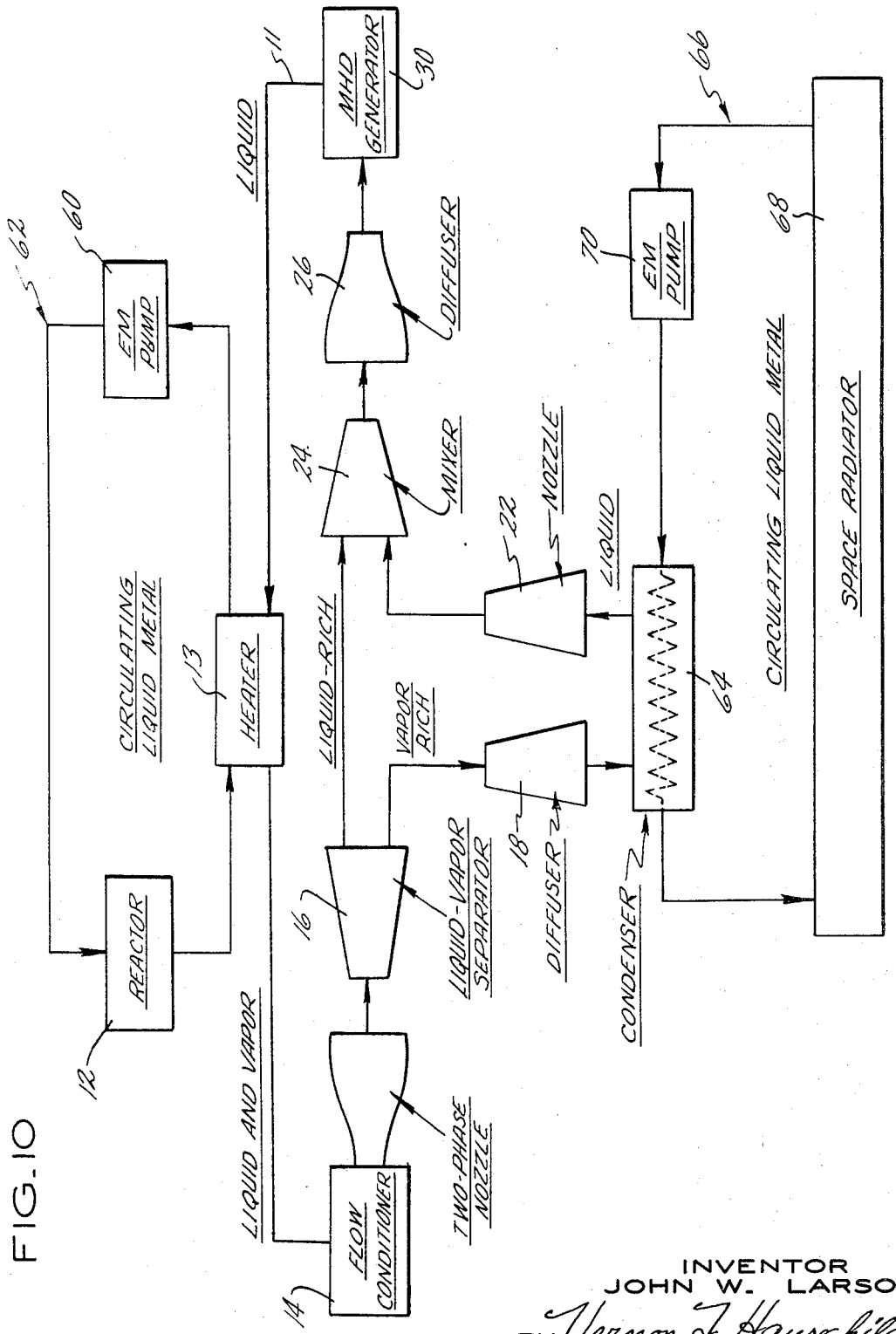

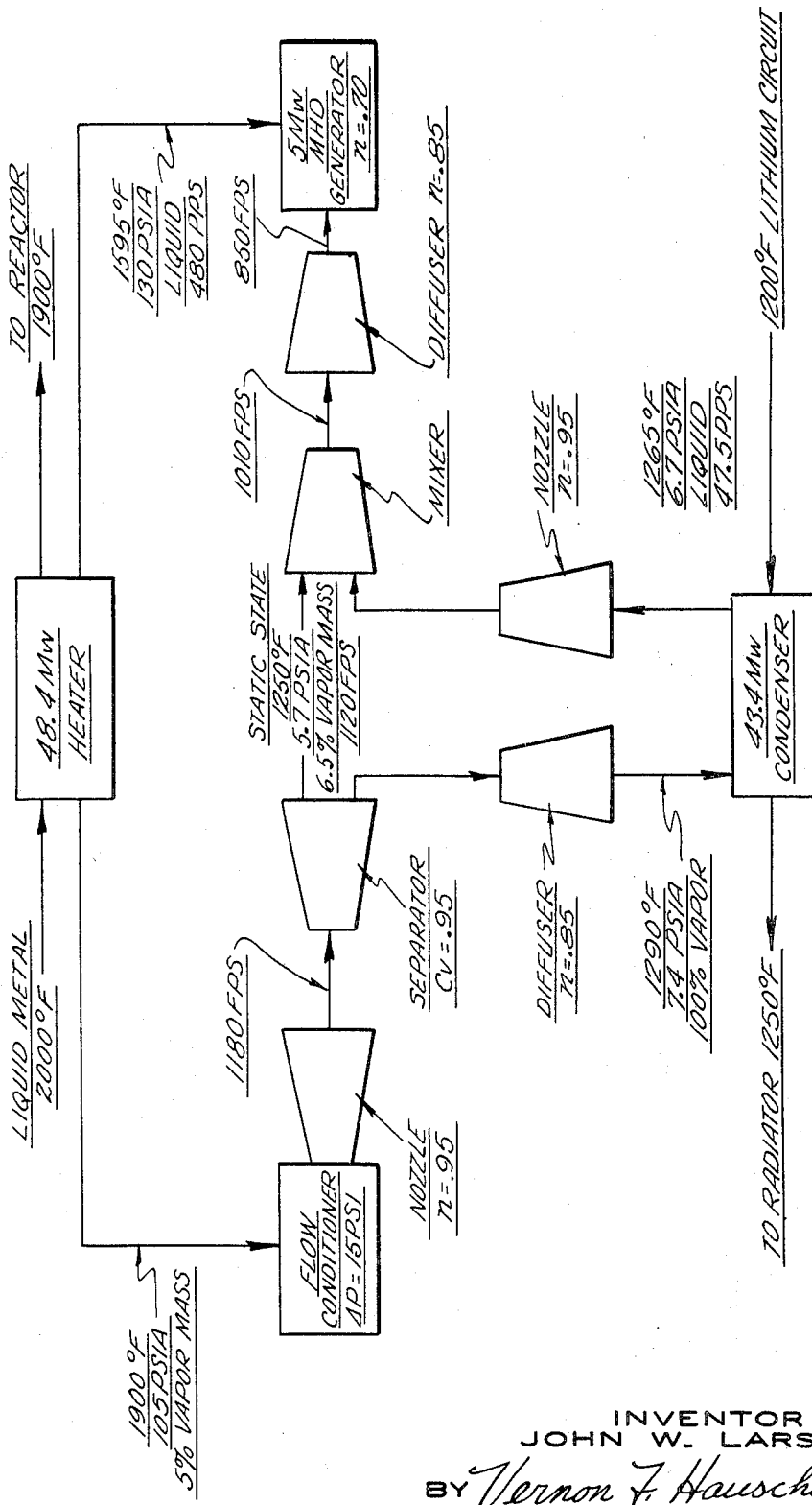

Sept. 10, 1968  J. W. LARSON  3,401,277
TWO-PHASE FLUID POWER GENERATOR WITH NO MOVING PARTS
Filed Dec. 31, 1962  16 Sheets-Sheet 9

INVENTOR
JOHN W. LARSON
BY Vernon F. Hauschild
ATTORNEY

Sept. 10, 1968  J. W. LARSON  3,401,277

TWO-PHASE FLUID POWER GENERATOR WITH NO MOVING PARTS

Filed Dec. 31, 1962  16 Sheets-Sheet 10

INVENTOR
JOHN W. LARSON
BY Vernon F. Hauschild
ATTORNEY

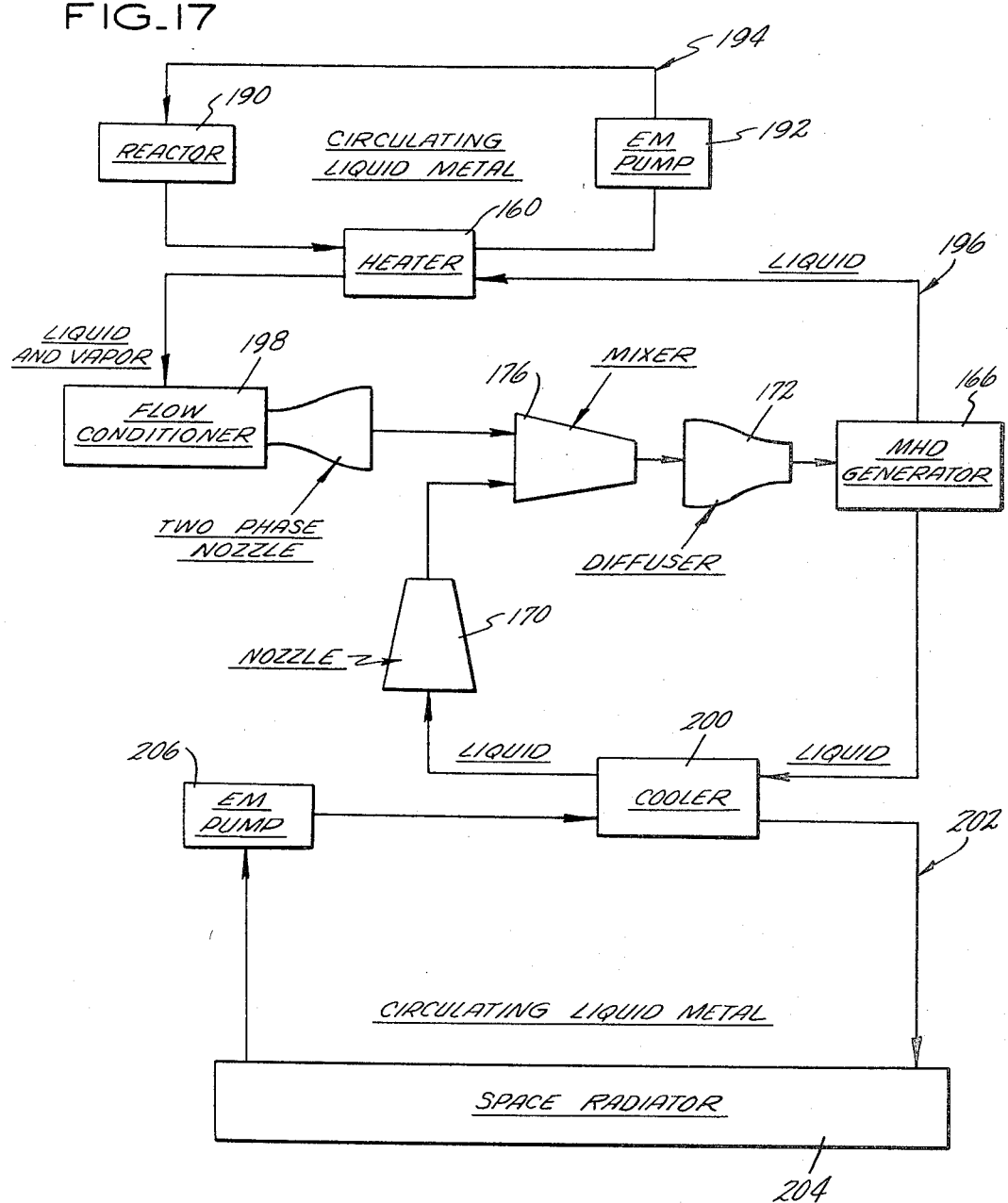

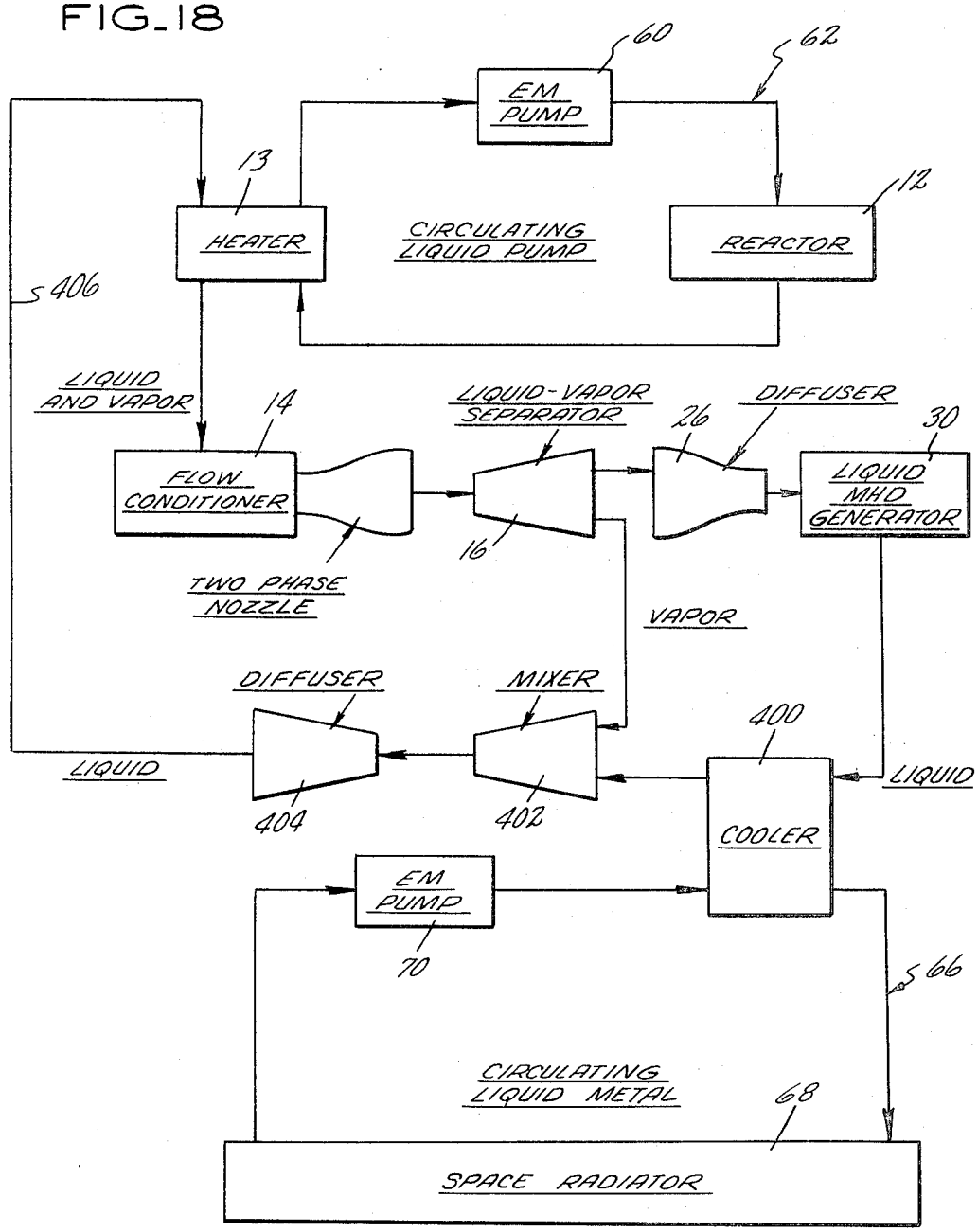

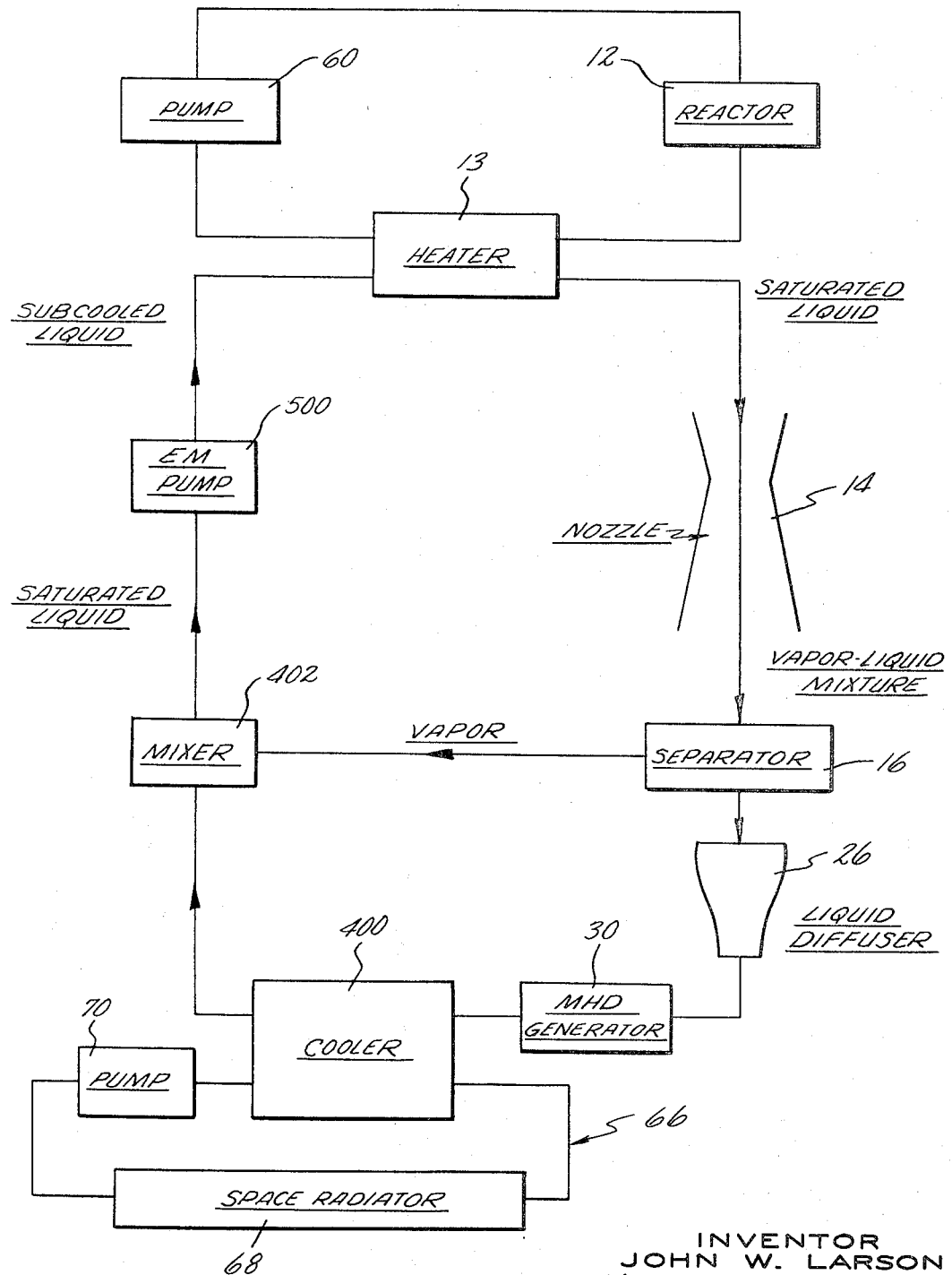

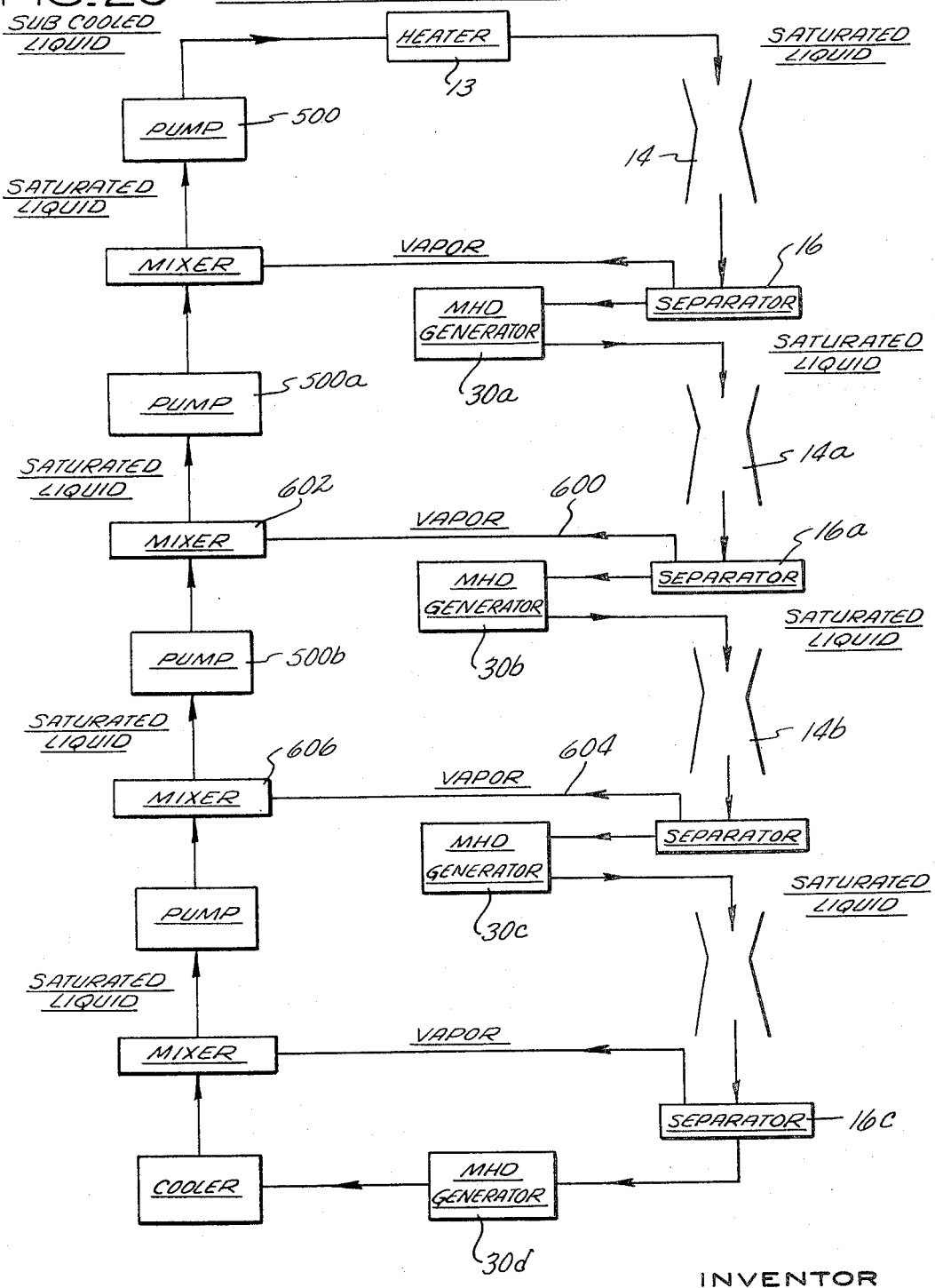

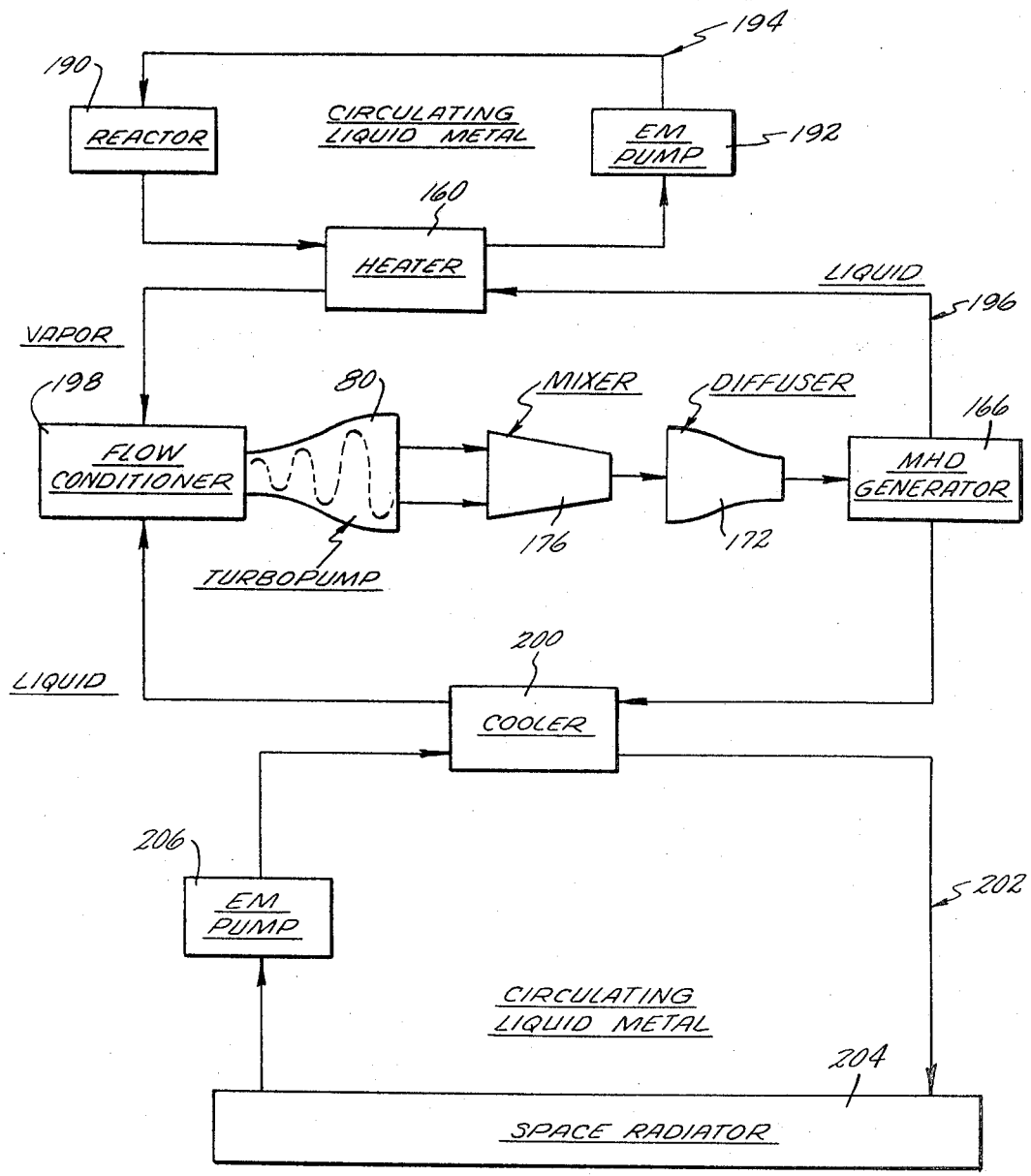

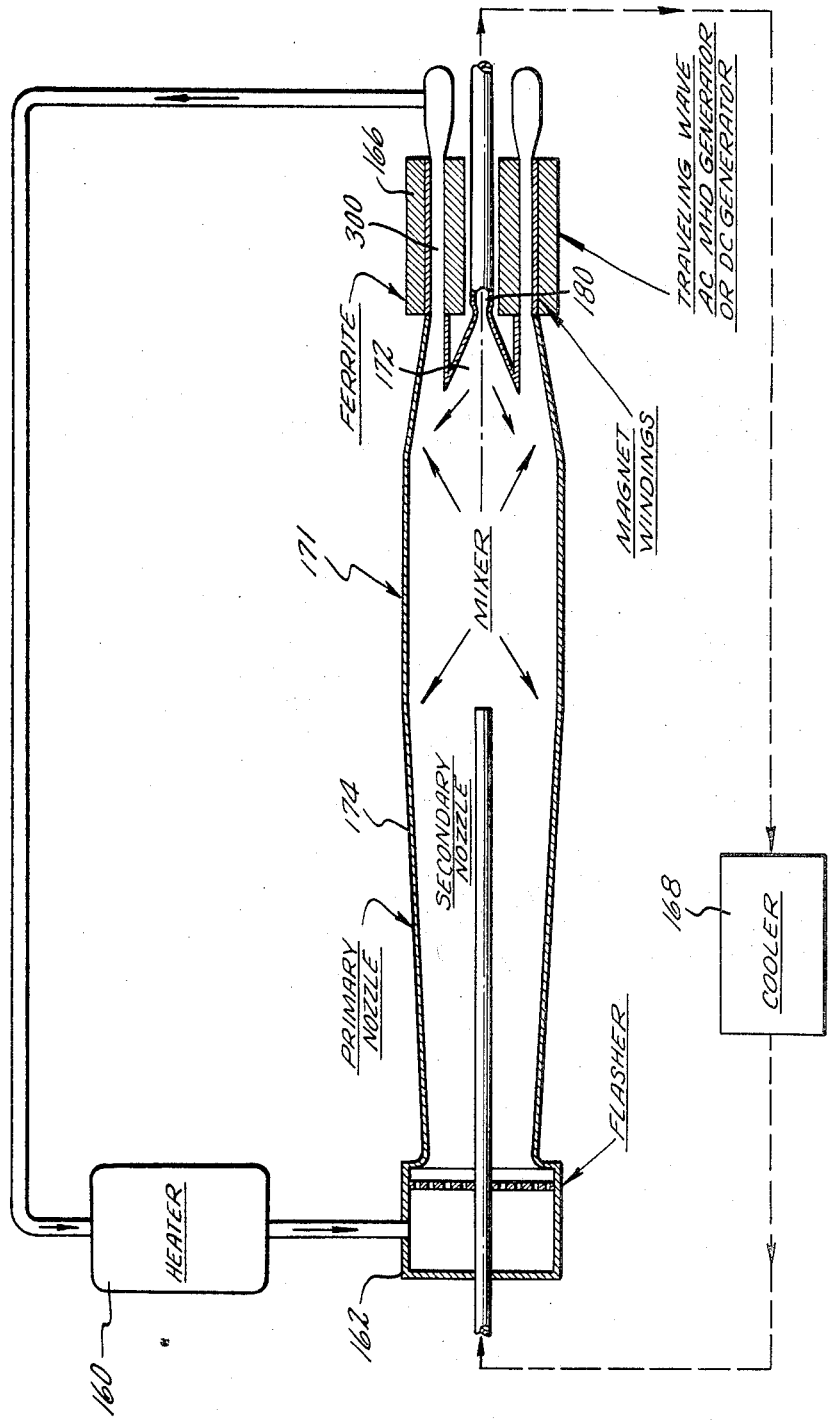

United States Patent Office 3,401,277
Patented Sept. 10, 1968

3,401,277
TWO-PHASE FLUID POWER GENERATOR WITH NO MOVING PARTS
John W. Larson, Glastonbury, Conn., assignor to United Aircraft Corporation, East Hartford, Conn., a corporation of Delaware
Filed Dec. 31, 1962, Ser. No. 248,532
37 Claims. (Cl. 310—11)

ABSTRACT OF THE DISCLOSURE

A two-phase fluid, closed loop, self-pumping power generator which converts thermodynamic energy to electric energy by vaporizing the fluid to a liquid-vapor mixture, accelerating the vaporized mixture to a high velocity, rejecting heat by use of either a vapor separator or a condensing apparatus called a jet pump to thereby produce high velocity liquid and then passing the high velocity liquid through an MHD generator.

---

This invention relates to power generating means and more particularly to power generating means utilizing a two-phase fluid.

It is an object of this invention to teach a two-phase fluid, closed loop, self-pumping gravity-free, power generator which has no moving parts and which, therefore, has low mechanical noise level, low vibration level, uses neither bearings nor seals, which has high temperature capability with low weight, low volume and high efficiency, and which has great potential for long time unattended operation.

It is a further object of this invention to teach such a two-phase liquid power generator in the form of a magnetohydrodynamic device which converts the thermodynamic energy of the fluid into electrical energy or, should a hydraulic turbine, i.e., a turbine being driven by the passage of liquid through its blades, or other similar work converting apparatus be used in place of the magnetohydrodynamic generator, then the thermodynamic energy of the fluid can be converted to mechanical or other types of energy.

It is still a further object of this invention to teach such a two-phase fluid generator which may be used as a topping cycle for conventional steam or gas turbine powerplants to improve the thermodynamic efficiency thereof.

It is still a further object of this invention to teach a two-phase liquid power generating system including heating means to vaporize the fluid to a liquid-vapor mixture, accelerating means to cause the vaporized mixture to travel at high velocity, heat rejection means to produce a high velocity liquid from the mixture, and energy conversion means through which the high velocity liquid is passed to produce energy, and wherein the heat rejection means may be a liquid vapor separator in a single fluid or a single mixture of fluids system, or vapor condensing apparatus, hereinafter called a jet pump, in a system using one or more fluids or one or more mixtures of fluids.

It is still a further object of this invention to provide a power generator in the form of a closed loop, two-phase fluid, self-pumping, thermodynamic cycle system which has application in outer space, in submarine operation, and other operations requiring a power generator which is gravity free and has no moving parts. In space application, a nuclear reactor may be used as the heat generating source and a magnetohydrodynamic generator may be used as the power extraction source which converts the thermodynamic energy of the fluid in the system to electrical energy.

It is still a further object of this invention to provide a practical apparatus and method of producing alternating electric current from an MHD generator.

Other objects and advantages will be apparent from the specification and claims and from the accompanying drawings which illustrate an embodiment of the invention.

FIG. 1 is a schematic diagram of Rankine cycle engine as used in a conventional steam powerplant installation.

FIG. 2 is an enthalpy-entropy phase diagram of a typical Rankine cycle engine.

FIG. 3 is an enthalpy-entropy diagram of the two-phase engine taught herein.

FIG. 4 is a schematic diagram of a two-phase engine using an MHD generator and a liquid vapor separator as the heat rejection means.

FIG. 5 is a temperature-entropy diagram of a two-phase engine using MHD generator and separator.

FIG. 7 is a heat balance and flow schematic of a two-phase engine using an MHD generator and a mercury cycle.

FIG. 8 is a flow schematic of a two-phase engine using an MHD generator and a potassium cycle.

FIG. 10 is a schematic diagram of a two-phase engine using an MHD generator to illustrate the flow schematic in a typical space application.

FIG. 11 is a heat balance diagram of the system illustrated in FIG. 10.

FId. 16 is a schematic diagram of a two-phase engine using an MHD generator and an alternate jet pump configuration.

FIG. 17 is a schematic diagram of a two-phase engine using an MHD generator with the jet pump cycle installation for a space application.

FIG. 18 is a modification of the FIG. 10 embodiment with an alternate cooling arrangement.

FIG. 19 is a modification of the FIG. 18 embodiment using an EM pump in place of a diffuser.

FIG. 20 is an embodiment illustrating a plurality of power generators of the type shown in FIG. 19 joined in series.

FIG. 21 is a schematic diagram of a two-phase engine using an MHD generator and a turbopump.

FIG. 22 illustrates a practical embodiment of a two-phase engine using an MHD generator with the jet pump cycle.

Solely for purposes of illustration, my invention will be described as a nuclear heated system using a magnetohydrodynamic generator but it will be evident to those skilled in the art that my power generating system may be used in other ways and for other applications using other types of heating and energy extraction apparatus.

Figure 6:
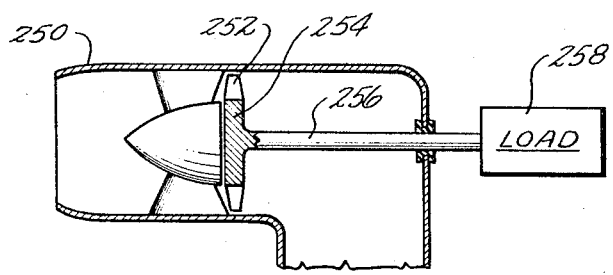
FIG. 6 is a schematic diagram of a conventional hydraulic turbine which could be used in place of the MHD generator in my two-phase engine whenever it is desired to convert thermal energy into mechanical energy as opposed to electrical energy.

For example, the energy extraction apparatus may be a fluid or hydraulic turbine as best shown in FIG. 6. Liquid flowing in conduit 250 passes through the blades 252 of hydraulic turbine rotor 254, which is mounted so as to be rotatable on load shaft 256. By causing reaction on the rotor blades 252, disc 254 is caused to rotate and hence causes shaft 256 to rotate, thereby converting the kinetic energy of the fluid into the mechanical energy in the load 258.

The conversion of nuclear fission energy into electrical power can be accomplished in a number of heat engine cycles. The methods of power conversion that have been actively pursued to date include the Rankine cycle, the Brayton cycle, and the thermionic cycle. My invention relates to a new type of power conversion system which will be identified herein as "Two-Phase MHD." MHD is the abbreviated form for magnetohydrodynamic.

The two-phase MHD engine employs a closed loop, self-pumping, gravity-free, two-phase fluid cycle and has the novel characteristic of having no moving mechanical parts so that it is a static device although a thermodynamic power conversion system is used. The elimination of bearings, seals and dynamic balancing provides long time unattended operation; which is required for nuclear space power. This engine also avoids the high temperature materials problems which are encountered in the thermionic cycle. Therefore, the two-phase MHD engine has advantages over the other types of most promising nuclear space power systems.

The two-phase MHD engine operates in the liquid-vapor transition domain of a working fluid, as does the Rankine cycle. However, the flow processes are radically different from the Rankine system, and the two-phase MHD engine is a new thermodynamic cycle.

Theory

To explain the operation of the two-phase MHD cycle, the distinctions of this cycle from the conventional Rankine cycle will be shown. FIG. 1 is a schematic diagram of a Rankine cycle as used in conventional steam powerplant installations. The ideal Rankine cycle consists of two constant pressure processes and two isentropic processes. The working fluid is heated in a boiler 50 from a subcooled liquid state to either a saturated or superheated vapor state. The vapor expands through a turbine 52 producing useful mechanical work, for example driving the rotating load assembly 53 and pump 58. Finally, the vapor is condensed in condenser 56 and pumped by pump 58 back into boiler 50. An enthalpy-entropy phase diagram of a typical Rankine cycle is shown in FIG. 2 which consists of the following processes: A–B constant pressure heat addition in a boiler or heater, B–C adiabatic expansion in a turbine, C–D constant pressure heat rejection in a condenser, and D–A adiabatic pressurization in a pump. The net power output is the difference between turbine work output and pump work input.

The thermodynamic characteristics of the non-rotating, two-phase engines differ from those of the Rankine cycle. To begin with, the working fluid is only partially vaporized prior to expansion. Then, in the expansion process work is not produced by the working fluid, but rather, thermodynamic potential energy is converted into fluid kinetic energy. This kinetic energy is retained by the fluid through the heat rejection process. After this process, the kinetic energy can be converted back into thermodynamic energy and useful work can be extracted from the working fluid which is now in the liquid phase. Finally, the working fluid returns to the boiler. FIG. 3 presents an enthalpy-entropy diagram for a typical non-rotating two-phase engine which consists of the following processes: A–B constant pressure heat addition, B–C adiabatic expansion in a nozzle, C–D constant pressure heating rejection, D–E adiabatic compression in a diffuser, and E–A extraction of available work.

As used herein, single fluid means either a sole fluid or a single mixture of several fluids.

The two-phase MHD engine is unique because, in the expansion process no energy is removed from the fluid and hence the drop in static potential energy in the fluid will equal the increase of kinetic energy, i.e., the fluid will accelerate to a high velocity. Now the partial condensation process can be duplicated by rejection of heat from the high velocity fluid with minimum loss in momentum. This heat rejection can be accomplished by separating out a portion of vapor, condensing this vapor to liquid, and returning the liquid to the main flow or by condensing some of the vapor by the addition of cooled liquid. The compression process converts the kinetic energy of the working fluid into potential energy in a diffuser thereby condensing the remaining vapor. The net work output is equal to the difference in expansion and compression work. In the flow processes of the two-phase MHD engine, no energy is removed from the working fluid in the expansion process. Therefore, the energy which can be converted into useful work is still in the working fluid following the compression process. The conversion of all the kinetic energy of the working fluid to potential energy in the diffusion process yields a static pressure far in excess of the boiling pressure, indicating a highly pressurized state for the liquid. This net pressure difference represents thermodynamic or hydraulic energy which may be converted either into mechanical work by means of a hydraulic turbine, or into electrical energy by means of a MHD generator which is analogous to an electromagnetic, i.e., EM pump. In view of the aforementioned static pressure which is generated in my engine, it will be recognized by those skilled in the art that the engine fluid is not only self-pumping but that sufficient energy is gained that work may be extracted therefrom in addition.

As previously stated, the heat rejection means in my two-phase engine may be either a liquid-vapor separator or a vapor condensing apparatus called a jet pump. My two-phase engine will now be described first using the separator and then using the jet pump.

Two-phase MHD engine-separator system

The basic two-phase MHD engine cycle will now be described and is shown in FIGS. 4 and 5. FIG. 4 represents a closed loop conduit system 10 containing the apparatus illustrated thereon and FIG. 5 is the temperature -entropy chart therefor. While FIG. 4 illustrates the separator system, other systems could be substituted therefor such as the jet jump system described hereinafter.

Referring to FIGS. 4 and 5 heat is added to the working fluid by convection, either directly or indirectly, from the nuclear fission reactor 12, such as that taught in United States Patent No. 2,708,656, or other conventional heat sources. The working fluid which may be any fluid which is electrically conducting when liquid such as mercury, potassium, cesium, sodium, rubidium and lithium, or other liquid metal, or some combination thereof, is being passed through close loop 11 and is a liquid at position J, and is either a liquid or a relatively low-quality liquid-vapor two-phase mixture at position A. The working fluid, which leaves the heat addition component at relatively low velocity is accelerated in a thermodynamic exapnsion to a high velocity in passing through a convergent-divergent nozzle 14 in an adiabatic process to state B which is a static thermodynamic condition. The working fluid at this point is a mixture of liquid droplets and saturated vapor. The working fluid is next subjected to centrifugal or other type forces in a separator 16 to yield two different flows varying in liquid content. The mixture at position C is at high velocity and liquid rich, i.e., lower quality than that at state D, and that at position D is also at high velocity but vapor rich, i.e., higher quality than state C. The kinetic energy of the vapor-rich mixture at position D is converted into potential energy in a subsonic or supersonic diffuser 18. The heat of vaporization of the vapor portion of the mixture is then removed by the heat rejection system 20. The condensate is now returned through a nozzle 22, to mix in mixer 24, which may be of the injector or ejector type with the liquid-rich mixture, state C, which was produced by the separator 16. Mass, momentum, and energy are conserved in the mixing process. The fluid is at state H following the mixing process. A portion of the kinetic energy of the mixed stream is now converted into potential energy so as to condense the remaining vapor in supersonic diffuser 26. Most of the remaining kinetic energy of the new liquid working fluid is converted into electrical energy in an MHD generator 30, which may be of the type shown in U.S. Patent No. 3,091,709 or the article entitled "Space-Travel Generator: How It Works" on pages 82–84 of the Nov. 27, 1959 issue of Electronics. A sufficient amount of kinetic energy is retained in the working fluid for conversion into pressure to satisfy the pressure at position J. The conversion of kinetic to electric energy in a MHD generator 30 consists of passing the fluid in conduit 27 through a magnetic field which is created by magnet 29 and which is perpendicular to the direction of fluid motion.

An electric current will then flow in a direction mutually perpendicular to the directions of fluid motion and the magnetic field. The magnitude of this current is directly proportional to the electrical conductivity of the fluid. Therefore, if a conductive liquid metal is used as the working fluid and the energy of expansion through a nozzle is imparted to the liquid which is then separated from the vapor metal, the power conversion can be accomplished in an MHD generator of high performance.

The powerplant flow schematic is shown in FIG. 7. The thermal power source is a SNAP-8 type reactor which has been uprated sufficiently for 150 kilowatt electric, i.e., kwe., net power output. This reactor has a coolant outlet temperature of 1300° F. and is cooled by NaK. The reactor coolant is circulated to a heater where it gives up its heat to mercury, which was the selected working fluid in this particular two-phase MHD engine. Since the working fluid does not vaporize in the heater, the mercury can leave the heater at a higher temperature than in the present SNAP-8 powerplant design. Thus the mercury temperature is raised from 1200° F. to 1250° F.

Starting with a nozzle inlet temperature of 1250° F. and a pressure of 700 p.s.i.a., the mercury vapor is expanded to 700° F. which was selected on the basis of high cycle efficiency and low radiator area. The vapor qualities leaving the separator were selected at 80 percent entering the condenser diffuser and 7 percent entering the diffuser to the MHD generator. The following were the component efficiencies and pressures: Primary nozzle efficiency, 95%; Condenser diffuser efficiency, 80%; Condenser pressure loss, 5 p.s.i.; Condenser exit nozzle efficiency, 90%; Generator diffuser efficiency, 85%; MHD generator efficiency, 70%; and Heater pressure loss, 10 p.s.i.

The engine cycle yields a cycle efficiency of 10 percent with a mercury flow rate of 175 lbs./sec. for 150 kwe.

FIG. 8 shows a second powerplant flow schematic and heat balance using potassium as the working fluid. The selection of potassium allows the use of direct heat addition, i.e., direct heating of potassium in the SNAP-8 reactor.

Figure 9:
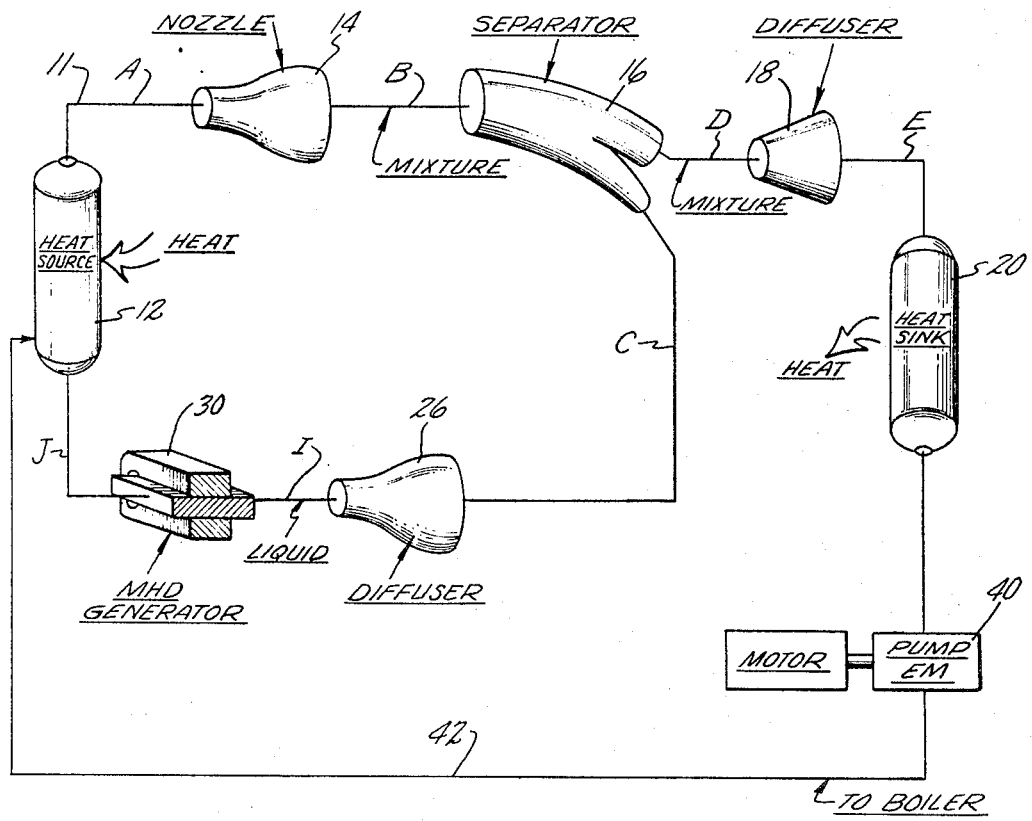
FIG. 9 is a schematic diagram of a two-phase engine using an MHD generator and an alternate separator arrangement.

An alternate MHD engine arrangement using the separator system is shown in FIG. 9. It will be noted that the FIG. 9 system differs from the FIG. 4 system in that the entire fluid discharge from heat sink 20 is pumped through motor or EM pump 40 through line 42 back to heat source. In addition, nozzle 22 and mixer 24 are eliminated such that the liquid-rich mixture from separator 16 flows from station C directly into supersonic diffuser 26. The advantage of this alternate arrangement shown in FIG. 9 over the arrangement shown in FIG. 4 is more flexibility of operation at the expense of the additional complexity of an EM pump.

FIG. 10 illustrates a cycle flow schematic of my two-phase MHD engine in a typical space application. Liquid metal, such as potassium, is heated in nuclear reactor 12 and is passed through heat exchanger 13 by the action of EM pump 60, with elements 12, 13 and 60 forming part of closed loop liquid metal circulating system 62. The working fluid of my two-phase MHD engine has heat added thereto in heater 13 and is passed in liquid-vapor form to the flow conditioner unit 14, which performs the function of providing a homogeneous vapor-liquid mixture and may consist of a homogeneously perforated plate extending across the flow passage through which the mixture must pass and which is used in conjunction with a two-phase accelerator nozzle to provide a high velocity liquid-vapor mixture to separator 16. As in the FIG. 4 configuration, the vapor-rich mixture passes through diffuser 18 and is then cooled in condenser 64 before passing through secondary nozzle 22 and mixer 24. It will be noted that condenser 64 is part of closed loop circuit 66 which includes space radiator 68 and EM pump 70, which serves the function of pumping the fluid, preferably a liquid metal such as NaK, through condenser 64 where it serves the function of cooling the vapor-rich mixture from diffuser 18, and which is itself cooled in space radiator 68, which may be of the finned-tube variety. A liquid-rich mixture from separator 16 mixes with the liquid from nozzle 22 in mixer 24 and is further liquefied in diffuser 26 before it is provided to MHD generator 30 as a high speed electrically conducting liquid to pass therethrough to generate electrical energy as previously described.

FIG. 11 illustrates a typical heat balance cycle of my FIG. 10 embodiment.

Referring to FIG. 18 we see another alternate flow schematic for my two-phase engine using the separator system. This scheme also represents a space application and differs from the scheme shown in FIG. 10 in that liquid from MHD generator 30 is cooled in cooler 400 and enters mixer 402 where it cools and liquefies the vapor-rich mixture which leaves liquid-vapor separator 16. The cooling action of the liquid from cooler 400 liquefies the mixture in mixer 402. The liquid velocity is reduced in diffuser 404 and is returned therefrom through conduit 406 to heater 13. The remainder of the FIG. 18 configuration is similar to the FIG. 10 configuration and corresponding reference numerals have been used to identify the corresponding parts.

FIG. 19 illustrates another modification of my two-phase engine using the separator system and is similar to the FIG. 18 configuration except that it illustrates that in cases where a less efficient mixer 402 is used, an EM pump 500 may be used to return the liquid to heater 13. In other respects, the FIG. 19 configuraton is the same as the FIG. 18 configuration and common reference numerals have been used to identify the corresponding parts.

FIG. 20 shows another alternate arrangement of my two-phase engine using the separator system and constitutes a series of power generators as illustrated in FIG. 19 joined in series. By this we mean that the saturated fluid discharged from an MHD generator 30a is passed on to flow conditioner 14a, then enters separator 16a from which the separated liquid therefrom enters MHD generator 30b while the vapor therefrom passes through line 600 to mixer 602. In similar fashion, the saturated liquid discharge from MHD generator 30b enters flow condenser 14b and separator 16b. The separated liquid from separator 16b enters MHD generator 30c while the separated vapor passes through line 604 to mixer 606, and the cycle continues in this fashion through any selected number of MHD generators.

Figure 12:
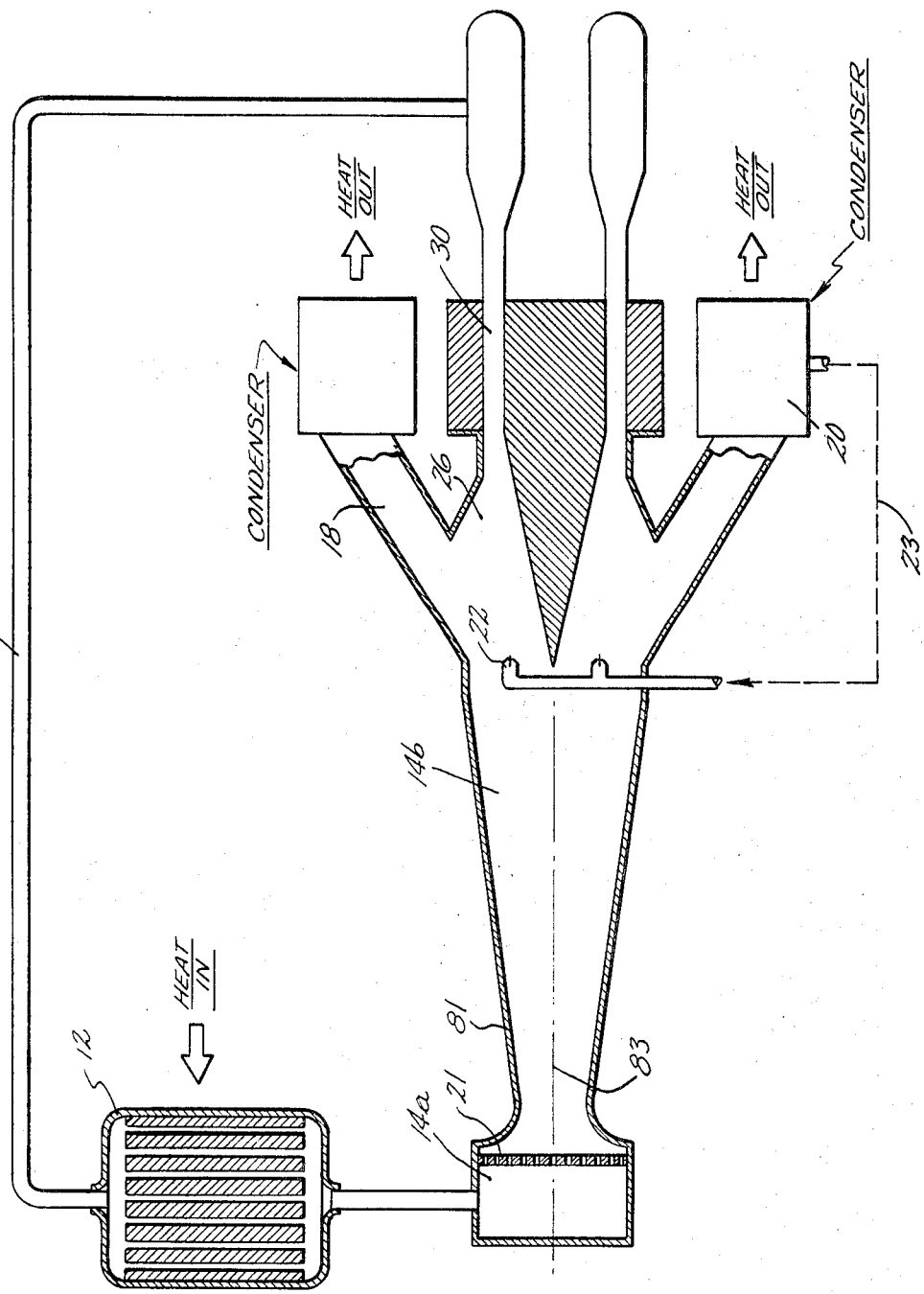
FIG. 12 is a practical embodiment of a two-phase engine using an MHD generator with separator.

FIG. 12 shows a preferred embodiment of my two-phase MHD engine using the separator cycle in an arrangement which constitutes a practical embodiment for proposed space, submarine, or flight use. For purposes of consistency, the same referenced numerals have been applied to the FIG. 12 configuration as are applied to FIGS. 4 and 9 systems. It will be noted that most of the powerplant of FIG. 12 is contained within engine casing 81 which is of circular cross-section and concentric about axis 83. Heat is added to the fluid in closed loop 11 in heat source 12 which may be a nuclear reactor consisting of end headers 13 and 15 joined by hollow tubes 17, through which the fluid will pass. The spaces between tubes 17 is filled with fissionable solid material 19, which, through nuclear action, generates heat and heats the walls of tubes 17, which in turn heat the fluid passing therethrough. After leaving heat source 12, the fluid, which is preferably partially vaporized, enters flow conditioner 14a and passes through homogeneous perforated plate 21, which serves to produce homogeneous mixture flow and is then accelerated in two-phase nozzle 14b to accelerate the homogeneous vapor-liquid mixture high velocity. The high velocity mixture then passes into separator 21 where the vapor and liquid are separated into a vapor-rich mixture and a liquid-rich mixture and the vapor-rich portion thereof passes through diffuser 18 to condenser 20, from whence it flows through line 23 to nozzle 22 for entry into mixer 24. The action of mixer 24 is to cause some of the vapor from the liquid-rich mixture from nozzle 14b to mix with the cooler condensate from nozzle 22 to liquefy the vapor and hence increase the liquid richness of the mixture. The liquid enriched mixture then passes through diffuser 26 for liquefaction therein and from whence it is passed through MHD generator 30 and then returns to the heat source 12.

*Two-phase MHD engine—Jet pump system*

The jet pump cycle is a two-phase fluid cycle and will now be described as a two-phase, closed loop MHD powerplant.

Figure 13:
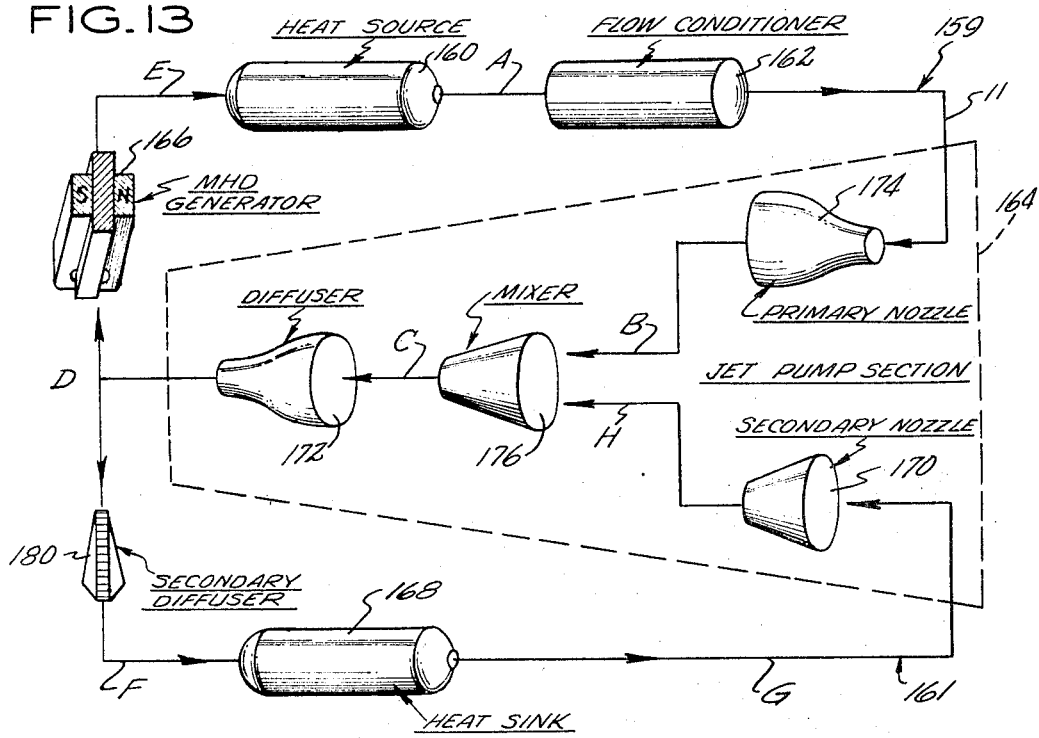
FIG. 13 is a schematic diagram of a two-phase engine using an MHD generator and using a jet pump as the heat rejection means.

FIG. 13 presents a schematic diagram of the jet pump cycle MHD powerplant showing the individual components that make up the system. As can be seen from the FIG. 13, the primary loop 159 of the system consisting of a heat source 160, flow conditioner 162, a jet pump section 164, and an MHD generator 166. The secondary or heat rejectional loop 161 consists of a heat sink 168, a nozzle 170 and a diffuser 172.

*Operation—Jet pump system*

After absorbing energy in the heat source 160, the working fluid in closed loop 11, which may be potassium or any of the previously mentioned fluids or a mixture thereof, enters the flow conditioner 162 as a saturated liquid or low vapor quality two-phase mixture. The flow conditioner 162 generates a two-phase vapor-liquid mixture by flashing the saturated liquid metal. The two-phase mixture leaving flow conditioner or flasher 162 enters the primary nozzle 174 where it is expanded, converting thermodynamic to kinetic energy to achieve a high velocity. Subcooled liquid metal from the secondary loop joins the high velocity two-phase mixture in the mixer or injector 176. The subcooled liquid entering the mixer 176 is accelerated by the high velocity primary nozzle flow as it mixes therewith. While the subcooled liquid is mixing with the two-phase mixture, it condenses some of the vapor, and reduces the quality, i.e., vapor content, of the mixture to thereby increase its liquid content. The resulting mixture then passes through the diffuser 172 where it is sufficiently diffused to condense the remaining vapor and hence produce a high velocity liquid. The flow is then split with part of the liquid entering the MHD generator 166 and the remainder entering the secondary loop where it is diffused in diffuser 180, cooled in the heat sink 168, and returned to the secondary nozzle 170. In the MHD generator 166, an applied magnetic field converts the kinetic energy of the fluid to electrical energy. The liquid leaving the MHD generator then returns to the heat source 160 thereby completing the cycle.

Figure 14:
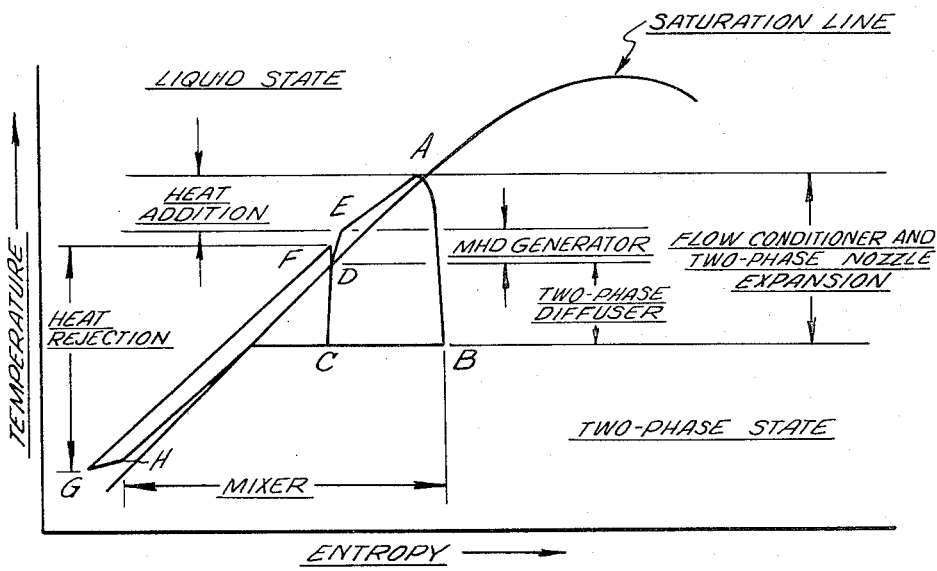
FIG. 14 is a temperature-entropy phase diagram of the engine configuration illustrated in FIG. 13.
Figure 15:
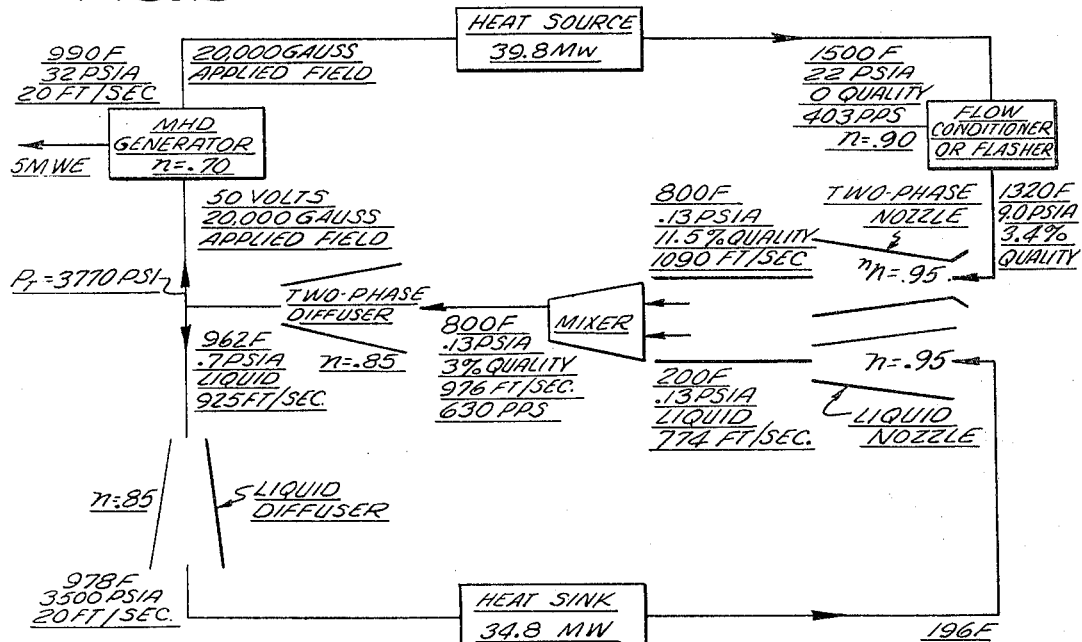
FIG. 15 is a two-phase engine using an MHD generator with a potassium cycle and a jet pump configuration.

FIG. 14 presents a temperature-entropy phase diagram of the jet pump cycle which is alphabetically keyed to the schematic cycle diagram shown in FIG. 13. FIG. 15 is a cycle diagram of a 5 megawatts electric prototype of the jet pump cycle using potassium as the working fluid.

Figure 16:
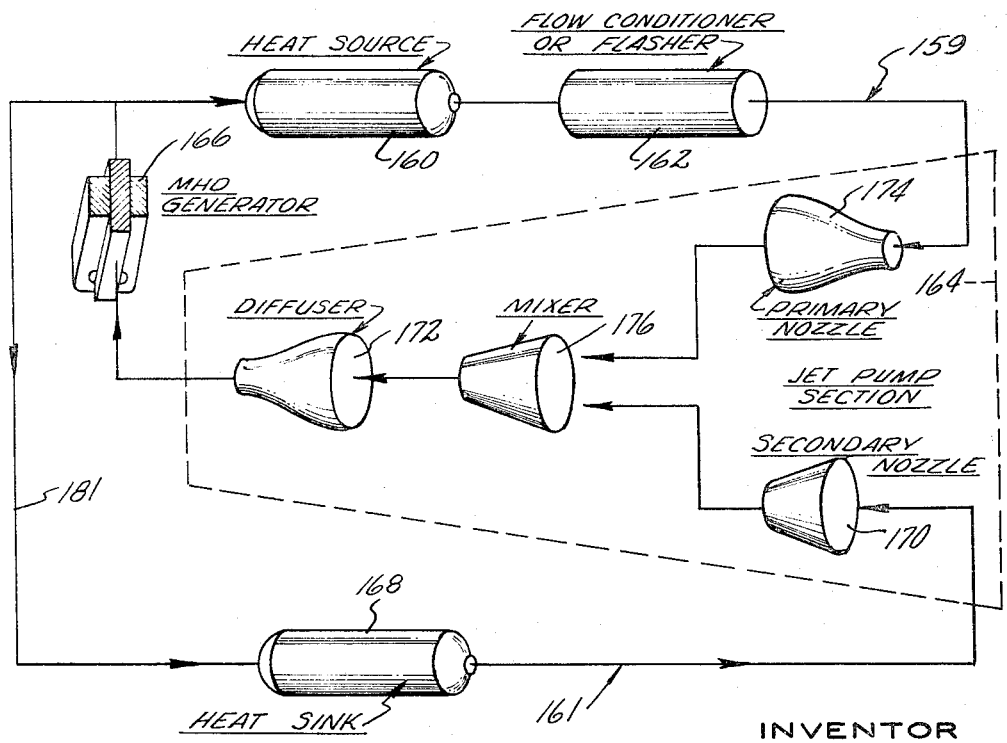

FIG. 16 illustrates an alternate jet pump system which differs from the system shown in FIG. 13 in that diffuser 180 is eliminated and the fluid which passes through the MHD generator 166 is split downstream thereof such that a first portion of it is passed to heat source 160 while a second portion of it is passed through line 181 to heat sink 168. In this modified FIG. 16 configuration, the heat sink 168 will handle liquid at a lower pressure and hence the liquid cooling problem is less difficult. However, the advantage of a FIG. 13 construction thereover is that high speed liquid is more desirable in mixer 176, since it affords greater energy conservation.

The flow schematic for a jet pump cycle having application to a space environment is shown in FIG. 17. In the FIG. 17 embodiment, nuclear reactor 190, heat source 160, and EM pump 192 are parts of circulating liquid metal closed loop system 194. The loop 194 liquid metal may be lithium. In loop 194, the EM pump 192 passes liquid metal through reactor 190 for heating therein, and then through heater 160 where it imparts its heat to the working fluid of the MHD closed loop 196. The MHD loop fluid is heated in heater 160 and passes as a liquid-vapor, i.e., two-phase, mixture into flow conditioner 198, which may constitute flow conditioner 162 and primary nozzle 174 of the FIG. 13 configuration, such that a high velocity two-phase fluid mixture passes therefrom into mixer 176. At the same time, a cooled liquid from nozzle 170 mixes with the flow conditioner mixture in mixer 176. The liquid from nozzle 170 has been cooled since, in being provided thereto from MHD generator 166, the fluid passes through cooler 200. Cooler 200 is part of closed loop 202, which also includes space radiator 204 and EM pump 106 such that a liquid metal, such as NaK, is pumped by the EM pump through the space radiator where it is cooled and, thence, through cooler 200 where it is used to cool the MHD system liquid which is passing therethrough from MHD generator 166 to nozzle 170.

After leaving mixer 176, the mixture enters supersonic diffuser 172, and leaves as a metal to be passed through MHD generator 166 to provide for conversion therein of the thermodynamic kinetic energy of the high velocity liquid to electrical energy. After passing through MHD generator 166, a portion of the liquid passes to cooler 200, while the remainder of the liquid passes to heater 160.

The FIG. 21 embodiment differs from FIG. 17 embodiment in that vaneless turbo-pump 80 cooperates with flow conditioner 14. In the vaneless turbo-pump 80, the energy of the driving vapor is transferred to the driven liquid by the pumping action thereof and results in a more efficient process. A complete description of a vaneless compressor or turbine 80 is given in United States Patent No. 3,046,732. The same reference numerals have been used on the FIG. 17 and 21 embodiments to illustrate comparable components.

FIG. 22 illustrates a practical embodiment of my two-phase MHD engine using the jet pump system which would be applicable to flight, space, submarine and other types of powerplant installations. For the purpose of consistency, the reference numerals used in FIG. 13 will be used in the description for FIG. 22. It will be noted that the FIG. 22 embodiment includes engine case 171, which is of circular cross-section and concentric about axis 173. The heater fluid from the heat source 160 enters flow conditioner 162 and is then accelerated in primary nozzle 174 and it is then mixed in mixer 176 with the cooled liquid from secondary nozzle 170. The cooled liquid is provided to secondary nozzle 170 from cooler 168, which receives liquid for cooling from MHD generator 166 through diffuser 180. After mixing with the cooled liquid from the secondary nozzle 170, in mixer 176, the liquid rich mixture then passes into diffuser 172. The flow from diffuser 172 splits such that a portion thereof passes through annular passage 300 through MHD generator 166, while the remainder thereof passes through secondary diffuser 180 to heat sink 168.

It is to be understood that the invention is not limited to the specific embodiment herein illustrated and described but may be used in other ways without departure from its spirit as defined by the following claims.

I claim:

1. A two-phase, single fluid power source including means for partially vaporizing a single liquid to form a two-phase mixture, means to accelerate said mixture to a high velocity, means to increase the liquid richness of said mixture to produce a high velocity liquid, and means to extract useful power from said high velocity liquid, and wherein said liquid richness increasing means includes apparatus for cooling and hence liquefying at least some of the vapor within said mixture.

2. Apparatus according to claim 1 wherein said single fluid is a single mixture of fluids.

3. A two-phase, single working fluid power generating mechanism including means for adding thermodynamic energy to and partially vaporizing a single working liquid to form a two-phase mixture, means to convert said thermodynamic energy to kinetic energy and thereby accelerate said mixture to a high velocity, means to increase the liquid richness of said mixture to produce a high velocity liquid, and means to pass said high velocity liquid through an energy extracting device to extract useful power from said high velocity liquid, and wherein said liquid richness increasing means includes apparatus for cooling and hence liquefying at least some of the vapor within said mixture, and further wherein said energy extracting device is a magneto-hydrodynamic generator.

4. A two-phase, single working fluid power generating mechanism including means for adding thermodynamic energy to and partially vaporizing a single working liquid to form a two-phase mixture, means to convert said thermodynamic energy to kinetic energy and thereby accelerate said mixture to a high velocity, means to increase the liquid richness of said mixture to produce a high velocity liquid, and means to pass said high velocity liquid through an energy extracting device to extract useful power from said high velocity liquid, and wherein said liquid richness increasing means includes apparatus for cooling and hence liquefying at least some of the vapor within said mixture, and further wherein said energy extracting device is a hydraulic turbine.

5. The process of producing power from a single fluid comprising the steps of partially vaporizing a single liquid to produce a two-phased mixture, accelerating said mixture to produce a high velocity mixture, increasing the liquid richness of said mixture to produce a high velocity liquid, and extracting useful power from the high velocity liquid, and wherein said liquid enrichment step includes cooling said mixture to cause at least some of said vapor therein to liquefy.

6. A two-phase fluid self-pumping, gravity-free power generator with no moving parts comprising a closed loop single fluid conduit system having therewithin heating means to partially vaporize said fluid to produce a liquid-vapor mixture, accelerator means connected to said heating means to receive said mixture and accelerate said mixture to a high velocity, heat rejection means connected to said accelerator means to act upon said high velocity mixture to increase the liquid richness thereof to produce high velocity liquid, and work extraction means through which said high velocity liquid is passed to convert the energy of said high velocity liquid to another form of useful energy.

7. Apparatus according to claim 14 wherein said heat rejection means is a liquid-vapor separator.

8. Apparatus according to claim 14 wherein said heat rejection means is apparatus to cool and liquefy some of the vapor of said mixture to thereby increase the liquid richness of said mixture.

9. A closed loop, two-phase potassium self-pumping, gravity-free magneto-hydrodynamic generator with no moving parts comprising a closed loop conduit system having therewithin heating means to partially vaporize said potassium to produce a liquid-vapor potassium mixture, accelerator means connected to said heating means to receive said mixture and accelerate said mixture to a high velocity, heat rejection means connected to said accelerator means to act upon said high velocity mixture to separate the liquid and vapor thereof to produce high velocity liquid potassium and a magneto-hydrodynamic generator through which said high velocity liquid potassium is passed to convert the energy of said high velocity liquid potassium to electrical energy.

10. A two-phase mercury self-pumping, gravity-free, magneto-hydrodynamic generator with no moving parts comprising a closed loop conduit system having therewithin heating means to partially vaporize said mercury to produce a liquid-vapor mercury mixture, accelerator means connected to said heating means to receive said mixture and accelerate said mixture to a high velocity, heat rejection means connected to said accelerator means to act upon said high velocity mixture to separate the liquid and vapor thereof to produce high velocity liquid mercury, and a magneto-hydrodynamic generator through which said high velocity liquid mercury is passed to convert the energy of said high velocity liquid mercury to electrical energy.

11. A two-phase fluid self-pumping, gravity-free power generator with no moving parts comprising a closed loop, single fluid conduit system having therewithin heating means to partially vaporize said fluid to produce a liquid-vapor mixture, accelerator means in the form of a nozzle connected to said heating means to receive said mixture and through which said mixture is passed to accelerate said mixture to a high velocity, heat rejection means comprising a liquid-vapor separator connected to said accelerator means to act upon said high velocity mixture as it passes therethrough to establish a high velocity liquid rich mixture stream and a high velocity vapor rich mixture stream leaving said separator separately, first conduit means receiving said vapor rich mixture stream and including therein a diffuser, a heat sink and a nozzle to liquefy and cool said vapor rich mixture stream in passing therethrough and to discharge said cool liquid at high velocity, said first conduit means discharging said cool liquid at high velocity into a mixer, and further including second conduit means receiving said high velocity liquid rich mixture stream from said separator to said mixer for homogeneous mixing therein with high velocity, cool liquid from said first conduit means to produce a high velocity highly liquid rich mixture, a supersonic diffuser positioned to receive said high velocity highly liquid rich mixture from said mixer and furtrer increase the liquid richness thereof so that the mixture becomes a high velocity liquid, and work extraction means through which said high velocity liquid from said diffuser is passed to convert the energy of said high velocity liquid to another form of useful energy.

12. Apparatus according to claim 11 wherein said work extraction means is a magneto-hydrodynamic generator.

13. Apparatus according to claim 11 wherein said work extraction means comprises a hydraulic turbine.

14. A two-phase fluid, self-pumping, gravity-free power generator with no moving parts comprising a closed loop, single fluid conduit system having therewithin heating means to partially vaporize said fluid to produce a liquid-vapor mixture, accelerator means in the form of a nozzle connected to said heating means to receive said mixture and through which said mixture is passed to accelerate said mixture to a high velocity, heat rejection means comprising a liquid-vapor separator connected to said accelerator means to receive and act upon said high velocity mixture passing therethrough to produce and discharge separately therefrom a high velocity vapor rich mixture and a high velocity liquid-rich mixture, first conduit means connected to said separator to receive said high velocity vapor-rich mixture and including apparatus therein to liquefy said vapor-rich mixture and return said mixture so liquefied to said heating means, second conduit means connected to said separator to receive said high velocity liquid-rich mixture therefrom and including therein a supersonic diffuser, through which said high velocity liquid-rich mixture is passed to liquefy said mixture while maintaining the high velocity thereof to produce a high velocity liquid, and work extraction means through which said high velocity liquid is passed to convert the energy of said high velocity liquid to another form of useful energy.

15. Apparatus according to claim 14 wherein said liquefying apparatus in said first conduit means comprises a diffuser through which said vapor rich mixture is passed to reduce the velocity thereof, a heat sink through which said reduced velocity vapor rich mixture is then passed for cooling and liquefaction, and pump means through which said cooled liquid is then passed for pumping back to said heating means.

16. A two-phase fluid, self-pumping, gravity-free power generator for space application and with no moving parts comprising a closed loop fluid conduit system having therewithin heating means to partially vaporize said fluid to produce a liquid-vapor mixture, flow conditioner means to receive said liquid-vapor mixture from said heating means and to produce therefrom a homogeneous liquid-vapor mixture, accelerator means in the form of a nozzle connected to said flow conditioning means to receive said homogeneous mixture and through which said mixture is passed to accelerate said homogeneous mixture to a high velocity, heat rejection means comprising a liquid-vapor separator connected to said accelerator means to act upon said high velocity mixture as it passes therethrough to establish a high velocity liquid rich mixture and a high velocity vapor rich mixture leaving said separator separately, first conduit means receiving said high velocity vapor rich mixture and including therein a diffuser, a condenser and a nozzle to liquefy and cool said vapor-rich mixture in passing therethrough to produce a high velocity, cool liquid, said first conduit means discharging said high velocity, cool liquid into a mixer, and further including second conduit means directing said high velocity liquid rich mixture from said separator to said mixer from homogenous mixing therein with said high velocity, cool liquid from said first conduit means to produce a high velocity highly liquid-rich mixture, a supersonic diffuser positioned to receive said high velocity highly liquid rich mixture from said mixer and further increase the liquid richness thereof so that the mixture becomes a high velocity liquid, work extraction means through which said high velocity liquid from said diffuser is passed to convert the energy of said high velocity liquid to another form of useful energy, means to provide heat to said heating means, and means to cool said condenser.

17. Apparatus according to claim 16 wherein said means for providing heat to said heating means comprises a closed liquid metal loop including a pump for pumping said liquid metal, a nuclear reactor for receiving said liquid metal from said pump and adding heat thereto and from which said liquid heated metal passes through said heating means to provide heat thereto, and wherein said condenser cooling means includes a closed liquid metal loop including a space radiator to cool said liquid metal, and a pump to pump said cooled liquid metal from said space radiator to said condenser to cool said condenser and return said liquid metal to said space radiator to again cool said liquid metal.

18. A two-phase single fluid self-pumping, gravity-free powerplant with no moving parts comprising a closed loop fluid conduit system having therewithin heating means to partially vaporize said fluid to produce a liquid-vapor mixture, a powerplant housing of circular cross section and concentric about an axis enveloping flow conditioning means through which said liquid vapor mixture from said heating means is passed to provide a homogeneous liquid-vapor mixture, accelerator means connected to said flow conditioning means to receive said homogeneous mixture and accelerate said homogeneous mixture to a high velocity, heat rejection means connected to said accelerator means to act upon said high velocity mixture to increase the liquid richness thereof to produce high velocity liquid, and work extraction means through which said high velocity liquid is passed to convert the energy of said high velocity liquid to another form of useful energy.

19. Apparatus according to claim 18 wherein said heat rejection means comprises a liquid-vapor separator positioned to receive said high velocity mixture from said accelerator means and to separate said high velocity mixture into a high velocity vapor rich mixture and a high velocity liquid-rich mixture separated therefrom, a condenser connected to said separator to receive said vapor-rich mixture therefrom and to cool and condense said high velocity vapor-rich mixture to a high velocity liquid, a mixer connected to said condenser to receive said high velocity cooled liquid therefrom for injection into said mixer for mixing with said high velocity liquid rich mixture to cool and hence liquefy the vapor thereof to produce a high velocity liquid-rich mixture, a diffuser connected to said mixer to receive said high velocity liquid-rich mixture therefrom to increase the liquid richness thereof to produce a high velocity liquid.

20. A two-phase single fluid, self-pumping, gravity-free power generator with no moving parts comprising a closed loop, fluid conduit system having therewithin heating means to partially vaporize said fluid to produce a liquid-vapor mixture, accelerator means connected to said heating means to receive said mixture and accelerate said mixture to a high velocity, heat rejection means connected to said accelerator means to act upon said high velocity mixture to increase the liquid richness thereof to produce high velocity liquid including means for liquefying a portion of the vapor in said mixture to increase the liquid richness thereof, and work extraction means through which said high velocity liquid is passed to convert the energy of said high velocity liquid to another form of useful energy.

21. A two-phase fluid, self-pumping, gravity-free power generator with no moving parts comprising a closed loop fluid conduit system having t primary loop including a heat source to partially vaporize said fluid and produce a liquid-vapor pressure, a flow conditioner connected to said heat source to receive said mixture therefrom and to act upon said mixture to produce a homogeneous liquid-vapor mixture, a primary nozzle connected to said flow conditioner to receive said homogeneous liquid-vapor mixture and accelerate it to a high velocity homogeneous liquid-vapor mixture, a mixer connected to said primary nozzle to receive said high velocity homogeneous liquid-vapor mixture for mixing therein with a cooling agent to vaporize at least some of the vapor of said high velocity homogeneous liquid-vapor mixture to increase the liquid richness thereof and to produce a liquid rich high velocity homogeneous liquid-vapor mixture, a supersonic diffuser connected to said mixer to receive said liquid rich high velocity homogeneous liquid-vapor mixture therefrom and to liquefy the vapor content thereof to produce a high velocity liquid, and work extraction means connected to said diffuser to receive said high velocity liquid therefrom and convert the energy of said high velocity liquid to another useful form of energy in passing therethrough, and further wherein said mixing agent in said mixer is produced by a secondary loop which includes said mixer and said diffuser and which further includes a secondary diffuser to receive a portion of the high velocity liquid discharged from said diffuser to reduce the velocity thereof in passing therethrough, a heat sink connected to said secondary diffuser to receive the low velocity liquid therefrom and to cool said liquid to produce a low velocity cooled liquid, a secondary nozzle connected to said heat sink to receive said cooled low velocity liquid therefrom and to accelerate said cooled liquid in passing therethrough to produce and provide said cooling agent at high velocity to said mixer.

22. Apparatus according to claim 21 wherein said primary nozzle is of convergent-divergent construction.

23. Apparatus according to claim 21 wherein said fluid is a single fluid.

24. Apparatus according to claim 21 wherein said fluid is a single mixture of two or more fluids.

25. Apparatus according to claim 21 wherein said secondary loop comprises a heat sink which is connected to said first loop between said work extraction means and said heating means to receive a portion of the liquid flowing from said work extraction means to said heating means for cooling in said heat sink, and further includes a secondary nozzle connected to said heat sink to accelerate said cooled liquid to a high velocity to provide a high velociety cooling agent to said mixer, and which further includes said mixer, said diffuser, and said work extracting means connecting said secondary nozzle to said heat sink.

26. A two-phase fluid engine including heating means to partially vaporize said fluid to form a two-phase mixture, a two-phase nozzle connected to said heating means to accelerate said two-phase mixture to a high velocity, means connected to said two-phase nozzle to increase the liquid richness of said high velocity two-phase mixture to produce a high velocity liquid and including apparatus to cool and hence liquefy some of the vapor within said high velocity mixture to produce a high velocity liquid, power extraction means connected to said liquid enrichment means through which said high velocity liquid is passed to generate useful power, means connecting the discharge of said power extraction means to conduct a portion of the liquid therefrom to said heating means for vaporization therein, a cooler, means connecting the discharge of said power extraction means to said cooler for cooling therein, a secondary nozzle connected to said cooler to receive cooled liquid therefrom to accelerate said cooled liquid to a high velocity, means connecting said secondary nozzle to said high velocity mixture cooling means to serve to liquefy the vapor therein, means to provide heat to said heating means, and means to cool said cooler.

27. Apparatus according to claim 26 wherein said means which heat said heating means includes a closed liquid metal loop including a nuclear reactor and a pump to pump liquid metal through said nuclear reactor for heating therein and therefrom in heated form to said heating means to heat said engine fluid passing therethrough, and wherein said cooler cooling means includes a closed liquid metal loop including a space radiator, and a pump pumping liquid metal from said space radiator through said cooler to cool said engine liquid therein.

28. Apparatus according to claim 27 wherein said flow conditioner includes a vaneless turbopump which is connected to said mixture liquid enrichment means to provide a high velocity liquid-vapor mixture thereto from said heater, and wherein said cooler provides cooled liquid from said power conversion means to said flow conditioner for mixing therein with said liquid-vapor mixture from said heater to liquefy some of the vapor in said mixture and hence increase the liquid richness thereof.

29. Apparatus according to claim 21 including an engine case of circular cross-section and concentric about an axis wherein said flow conditioner, said primary nozzle, said mixer, said supersonic diffuser, and said work extraction means are positioned in axial alignment within said case.

30. Apparatus according to claim 17 wherein said condenser is a cooler and wherein the vapor-rich mixture in said first conduit means is cooled by the liquid discharged from said work extraction means, conduit means connecting said work extraction means to said mixer such that in passing therebetween, said liquid will pass through said cooler and be cooled therein such that cooled liquid is provided to said mixer therefrom to cool and hence liquefy the vapor content of said vapor-rich mixture in said mixer, and further including diffuser means connected to said mixer to receive said liquid therefrom to reduce the velocity thereof, and conduit means connecting said diffuser to said heating means to return the reduced velocity liquid from the diffuser to the heating means.

31. A two-phase liquid closed loop engine comprising heating means to vaporize said liquid, accelerator means connected to said heating means to receive said vaporized liquid therefrom and to accelerate said vaporized liquid in passing therethrough to produce a high velocity liquid-vapor mixture, separator means connected to said accelerator means to receive said high velocity liquid-vapor mixture therefrom and to separate said mixture into a high velocity vapor-rich mixture and a high velocity liquid rich mixture, a diffuser connected to said separator to receive said high velocity liquid rich stream therefrom and act thereupon to produce a high velocity liquid stream, a power generator connected to said diffuser to receive said high velocity liquid stream therefrom and convert the kinetic energy thereof into useful work, a cooler connected to said power generator to receive the liquid discharge therefrom and cool said liquid discharge to produce a cooled liquid, a mixer connected to said cooler to receive said cooled liquid therefrom and also connected to said separator to receive said high velocity vapor rich mixture therefrom so that said cooled fluid from said cooler will cool and hence liquefy the vapor in said high velocity vapor rich mixture to produce a high velocity liquid, means to return said liquid from said mixer to said heating means.

32. Apparatus according to claim 31 and including means to provide heat to said heater and means to cool said cooler.

33. Apparatus according to claim 32 wherein said heat adding means to said heater includes a closed loop fluid conducting system including a pump to pump said heating fluid through said nuclear reactor to heat said heating liquid and through said heater to heat the engine fluid, and wherein said cooler cooling means includes a closed loop fluid circuit including said cooler, a space radiator and a pump connected so that said pump pumps said cooling fluid through said space radiator for cooling therein and thence through said cooler for cooling the engine fluid.

34. A plurality of power sources connected in series and each utilizing a two-phase, self-pumping, gravity-free fluid cycle comprising a heater through which the fluid is pumped to form a liquid-vapor mixture therefrom, first accelerator means connected to said heater to receive said liquid vapor mixture and accelerated it to a high velocity, a first separator connected to said accelerator means to receive said high velocity liquid-vapor mixture therefrom and to separate said mixture into a high velocity-vapor rich stream and a high velocity liquid-rich stream, a first mixer connected to said separator to receive said high velocity vapor-rich stream therefrom and to cool and hence liquefy said vapor-rich stream, a first pump connected to said first mixer to receive said cooled liquid therefrom and to return said cooled liquid to said heater for heating therein to produce a further liquid-vapor mixture for transmittal to said first accelerator means, first power conversion means connected to said separator to receive said high velocity liquid-rich stream therefrom to convert the kinetic energy of said high velocity liquid-rich stream to useful power while reducing the velocity of said liquid-rich stream in the conversion process, second accelerator means connected to said first power conversion means to receive said reduced velocity liquid-rich stream therefrom and to accelerate said low velocity liquid-rich stream to a high velocity liquid-rich stream, a second separator connected to said second accelerator for receiving said high velocity liquid-rich stream therefrom and separate said high velocity liquid-rich stream into a second high velocity vapor-rich stream and a second high velocity liquid-rich stream, a second mixer connected to said second separator to receive said second high velocity vapor-rich stream therefrom and to cool and hence liquefy said vapor from said vapor-rich stream, second pump means connected to said second mixer to pump said cooled liquid therefrom to said first mixer to mix therein with said first high velocity liquid-rich stream in said first mixer and hence cool and liquefy said high velocity vapor stream, second power conversion means connected to said second separator to receive said second high velocity liquid rich stream therefrom and to convert the kinetic energy thereof into useful power while reducing the velocity thereof during said conversion process.

35. A first and second power plant each operating on a self-pumping, gravity-free two-phase single fluid cycle and comprising means to partially vaporize a single liquid to form a two-phase mixture, means to accelerate said mixture to a high velocity, means to increase the liquid richness of said mixture to produce a high velocity liquid, means to extract useful power from said high velocity liquid, and means connecting said power extraction means of said first powerplant to the vaporizing means of said second power plant such that the liquid discharge from said first powerplant power extraction means is provided to the vaporizing means of said second powerplants for vaporization therein for use in said second powerplant.

36. Apparatus according to claim 35 wherein said liquid enrichment means includes a liquid-vapor separator.

37. Apparatus according to claim 35 wherein said liquid enrichment means includes heat rejection apparatus.

References Cited
UNITED STATES PATENTS

| | | | |
|---|---|---|---|
| 3,031,977 | 5/1962 | Elliot | 103—258 |
| 3,158,764 | 11/1964 | Webb | 310—11 |
| 1,050,410 | 1/1931 | Wainwright | 60—36 |
| 3,294,989 | 12/1966 | Eichenberger | 310—11 |
| 3,320,000 | 5/1967 | Prem | 310—11 |

MILTON O. HIRSHFIELD, *Primary Examiner.*

D. X. SLINEY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,277                            September 10, 1968

John W. Larson

It is certified that error appears in the above identified patent and that said Letters Patent are hereby corrected as shown below:

Column 10, lines 3 and 5, claim reference numeral "14", each occurrence, should read -- 6 --.

Signed and sealed this 3rd day of February 1970.

(SEAL)
Attest:

Edward M. Fletcher, Jr.                      WILLIAM E. SCHUYLER, JR.
Attesting Officer                                Commissioner of Patents